US005969600A

United States Patent [19]

Tanguay

[11] Patent Number: 5,969,600

[45] Date of Patent: Oct. 19, 1999

[54] DANGEROUS CONDITION WARNING DEVICE INCORPORATING A TIME-LIMITED HUSH MODE OF OPERATION TO DEFEAT AN AUDIBLE LOW BATTERY WARNING SIGNAL

[75] Inventor: William P. Tanguay, Downers Grove, Ill.

[73] Assignee: Ranco Inc. of Delware, Wilmington, Del.

[21] Appl. No.: 09/025,498

[22] Filed: Feb. 18, 1998

Related U.S. Application Data

[60] Provisional application No. 60/038,277, Feb. 19, 1997.

[51] Int. Cl.[6] .......... B60Q 1/00

[52] U.S. Cl. .......... 340/438; 340/506; 340/526; 340/636; 340/635

[58] Field of Search .......... 340/500, 506, 340/507, 511, 529, 526, 635, 636, 641, 825.06, 825.16, 825.17, 332

[56] References Cited

U.S. PATENT DOCUMENTS

| | | | |
|---|---|---|---|
| Re. 33,920 | 5/1992 | Tanguay et al. | 340/628 |
| 3,932,850 | 1/1976 | Conforti et al. | 340/438 |
| 4,020,479 | 4/1977 | Conforti et al. | 340/438 |
| 4,091,363 | 5/1978 | Siegel et al. | 340/511 |
| 4,097,851 | 6/1978 | Klein | 340/517 |
| 4,138,664 | 2/1979 | Conforti et al. | 340/438 |
| 4,138,670 | 2/1979 | Schneider et al. | 340/507 |
| 4,139,846 | 2/1979 | Conforti | 340/438 |
| 4,225,860 | 9/1980 | Conforti | 340/438 |
| 4,258,261 | 3/1981 | Conforti | 340/438 |
| 4,287,517 | 9/1981 | Nagel | 340/636 |
| 4,302,753 | 11/1981 | Conforti | 340/438 |
| 4,583,072 | 4/1986 | Matsushita | 340/540 |
| 4,647,219 | 3/1987 | Figler et al. | 340/588 |
| 4,829,283 | 5/1989 | Spang et al. | 340/506 |
| 4,870,395 | 9/1989 | Belano | 340/693 |
| 4,884,065 | 11/1989 | Crouse et al. | 340/632 |
| 4,965,556 | 10/1990 | Brodecki et al. | 340/628 |
| 4,992,965 | 2/1991 | Hölter et al. | 701/36 |
| 5,034,725 | 7/1991 | Sorensen | 340/632 |
| 5,063,164 | 11/1991 | Goldstein | 436/169 |
| 5,066,466 | 11/1991 | Hölter et al. | 422/98 |
| 5,095,300 | 3/1992 | Alexander et al. | 340/693 |
| 5,103,216 | 4/1992 | Sisselman | 340/693 |
| 5,122,782 | 6/1992 | Kawahara | 340/632 |
| 5,172,096 | 12/1992 | Tice et al. | 340/501 |
| 5,252,949 | 10/1993 | Kirby et al. | 340/632 |
| 5,280,273 | 1/1994 | Goldstein | 340/632 |
| 5,285,792 | 2/1994 | Sjoquist et al. | 128/697 |
| 5,317,305 | 5/1994 | Campman | 340/573 |

(List continued on next page.)

*Primary Examiner*—Edward Lefkowitz
*Assistant Examiner*—Daryl C. Pope
*Attorney, Agent, or Firm*—Terrence Terry Martin; Jules Jay Morris; Sean Detweiler

[57] ABSTRACT

A battery operable dangerous condition warning device adapted to issue an alarm when a sensed dangerous condition exceeds a predetermined status incorporates a monitoring device circuit including: a processor, a dangerous condition sensor, a horn, a battery condition monitoring procedure cooperating with the processor to periodically check the integrity of the battery for detecting a first battery integrity condition in which battery failure can be expected after a relatively long period and a second battery integrity condition in which battery failure is imminent. The circuit further implements an audio low battery warning generator adapted to drive the horn to issue a distinctive audio warning (e.g., a single pulse of about 10 milliseconds duration each minute) in response to the detection of both the first and second battery integrity conditions A manually-actuable switch coupled to the processor permits inhibiting drive to the horn for a predetermined period if the first battery integrity condition is detected; however, actuation of the switch after the second battery integrity condition has been detected is prevented from temporarily inhibiting the drive to the horn. A visual battery condition indicator may also be provided to identify which of a plurality of dangerous condition warning devices in a given installation is experiencing the failing battery.

11 Claims, 31 Drawing Sheets

U.S. PATENT DOCUMENTS

| | | | |
|---|---|---|---|
| 5,422,629 | 6/1995 | Minnis | 340/630 |
| 5,440,293 | 8/1995 | Tice | 340/568 |
| 5,444,434 | 8/1995 | Serby | 340/628 |
| 5,473,167 | 12/1995 | Minnis | 250/573 |
| 5,483,222 | 1/1996 | Tice | 340/518 |
| 5,517,182 | 5/1996 | Yasunaga | 340/634 |
| 5,682,145 | 10/1997 | Sweetman et al. | 340/632 |
| 5,694,118 | 12/1997 | Park et al. | 340/632 |
| 5,764,150 | 6/1998 | Fleury et al. | 340/632 |
| 5,808,551 | 9/1998 | Yarnall et al. | 340/573 |

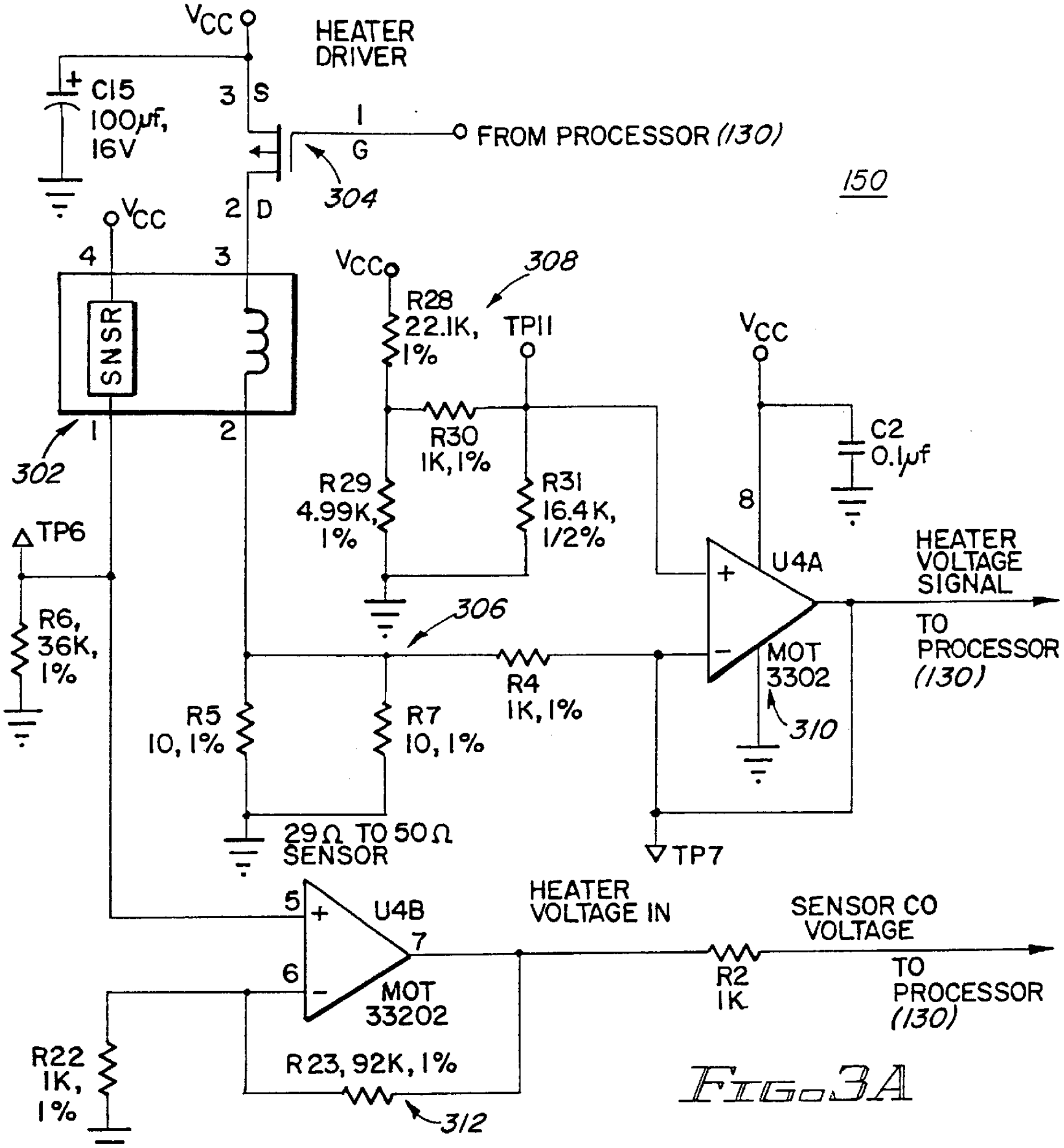
FIG. 3A
FIG. 3B
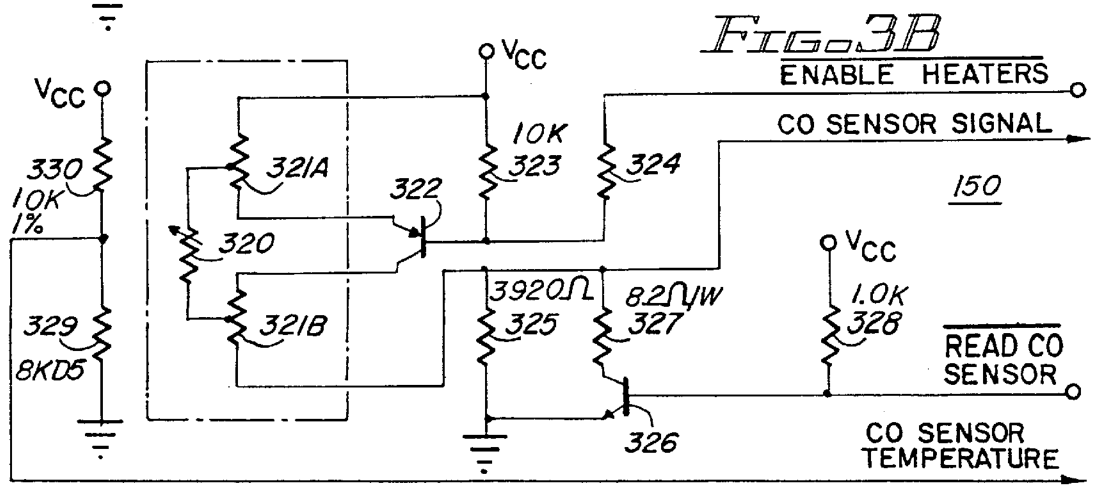

DANGEROUS CONDITION WARNING DEVICE INCORPORATING A TIME-LIMITED HUSH MODE OF OPERATION TO DEFEAT AN AUDIBLE LOW BATTERY WARNING SIGNAL

CROSS REFERENCE TO RELATED PROVISIONAL APPLICATION

This application claims the benefit of the filing date of U.S. Provisional Patent Application Serial No. 60/038,277 filed Feb. 19, 1997, entitled DANGEROUS CONDITION WARNING DEVICE by William P. Tanguay and Ernest Soderlund.

FIELD OF THE INVENTION

The present invention relates generally to devices for generating warnings of the presence of dangerous conditions, such as fire or combustion products or carbon monoxide, in an enclosed space such as a home or office.

BACKGROUND OF THE INVENTION

In general, devices for detecting and generating a warning with respect to dangerous conditions, such as the presence of combustion products or carbon monoxide, are known. For example, various smoke detector systems are described in U.S. Pat. No. RE 33,920, reissued on May 12, 1992, to Tanguay et al; U.S. Pat. No. 4,870,395 issued Sep. 26, 1989, to Belano; and U.S. Pat. No. 4,965,556 issued Oct. 23, 1992, to Brodecki et al, all the foregoing referenced patents being commonly assigned with the present invention. Other examples of such detectors are described in U.S. Pat. No. 3,932,850 issued to Conforti et al on Jan. 13, 1976; U.S. Pat. No. 4,020,479 issued to Conforti et al on Apr. 26, 1977; U.S. Pat. No. 4,091,363 issued to Siegel et al on May 23, 1978; U.S. Pat. No. 4,097,851 issued to Klein on Jun. 27, 1978; U.S. Pat. No. 4,225,860 issued to Conforti Sep. 30, 1980; U.S. Pat. No. 4,258,261 issued to Conforti on Mar. 24, 1981; U.S. Pat. No. 4,302,753 issued to Tice on Aug. 8, 1995; U.S. Pat. No. 5,473,167 issued to Minnis on Dec. 5, 1995; U.S. Pat. No. 5,483,222 issued to Tice on Jan. 9, 1996; U.S. Pat. No. 4,097,851 issued to Klein on Jun. 27, 1978; U.S. Pat. No. 4,138,664 issued to Conforti on Feb. 6, 1979; U.S. Pat. No. 4,138,670 issued to Schneider et al on Feb. 6, 1979; U.S. Pat. No. 4,139,846 issued to Conforti on Feb. 13, 1979; U.S. Pat. No. 4,225,860 issued to Conforti on Sep. 30, 1980; U.S. Pat. No. 4,287,517 issued to Nagel on Sep. 1, 1981; U.S. Pat. No. 4,829,283 issued to Spang et al on May 9, 1989; U.S. Pat. No. 5,172,096 issued to Tice et al on Dec. 15, 1992; U.S. pat. No. 5,422,629 issued to Minnis on Jun. 6, 1995; and U.S. Pat. No. 5,440,293 issued to Tice on Aug. 8, 1995.

Most combustion product detectors employ ionization chamber and/or photoelectric sensors. Carbon monoxide (CO) detectors are also known. In general, CO detectors employ one of three types of detectors: semiconductor, biomimetic and electrochemical.

Semiconductor CO sensors typically employ a thin layer of metal, such as tin dioxide, maintained at a relatively high temperature (e.g., 100° C. to 400° C.). The surface conductivity of the metal varies generally proportionally in accordance with exposure to ambient CO concentration. The semiconductor chip measures the migration of oxygen molecules through the surface of the sensor material. Such semiconductor CO sensors have drawbacks in that they have relatively high power requirements and are therefore not practical for battery units. In addition, many semiconductor CO sensors require high temperature (e.g., 400° C.) purging to burn off attracted CO on a periodic basis; e.g., every 2.5 minutes. There is also difficulty in determining the efficiency or working condition of semiconductor CO sensors; self-diagnostic tests are not generally available. In addition, semiconductor CO sensors tend to be sensitive to other gases in addition to carbon monoxide, giving rise to a potential for false alarms, and sensor accuracy can drift substantially (up to 40%) over time.

Biomimetic sensors utilize a transparent substrate disk coated with a synthetic hemoglobin that mimics the reaction of natural hemoglobin in the presence of carbon monoxide. The biomimetic material darkens with cumulative absorption of CO. A light emitting diode (LED) transmits light through the biomimetic material to a photosensitive device. When the material becomes sufficiently dark to prevent adequate light from reaching the photosensitive device, the detector sounds an alarm. An example of a biomimetic sensor is described in U. S. Pat. No. 5,063,164 issued to Goldstein on Nov. 5, 1991.

Biomimetic sensor based systems are disadvantageous in a number of respects. The time period necessary for the sensor to recover from exposure to carbon monoxide is relatively long time (e.g., 24 to 48 hours). Thus, assuming that the alarm system is silenced until the sensor recovers, the occupants of the home are unprotected during that period. In addition, exposure to particularly high levels of CO can permanently darken the sensor. Further, biomimetic sensors are susceptible to generating false alarms because their self-diagnostic capabilities tend to be limited.

Electrochemical sensors, in general, employ a chemical reaction to convert CO to carbon dioxide ($CO_2$) to create a chemical imbalance in a portion of the cell which in turn generates a current indicative of the amount of CO present. Some electrochemical sensors utilize two chambers (one for CO and one for hydrogen). However, calibration of the sensor is required, and self-diagnostic capabilities tend to be limited.

Various standards have been set with respect to the performance of dangerous condition alarms for residential use. For example, Underwriters Laboratory (UL) in the United States and Canada have promulgated standards UL 217, ULC-S531, UL 268 and ULC-S529 with respect to smoke detectors and UL 2034 (effective Oct. 1, 1995) with respect to CO detectors.

UL standards for dangerous condition alarm systems for residential use typically define certain alarm conditions. For example, UL 2034, requires that a CO detector generate an alarm in response to cumulative exposure to CO concentrations at specified levels measured in parts per million (PPM) within predetermined time periods (e.g., sound an alarm at 100 PPM in less than 90 minutes, 200 PPM in less than 35 minutes and 400 PPM in less than 15 minutes). However, in order to reduce nuisance alarms, the UL standard also requires that a CO detector ignore cumulative exposure to various low concentrations of CO for minimum time periods (e.g. 15 PPM for up to 30 days, with additional exposure to 35 PPM for one hour twice a day to simulate potential cyclical changes in CO levels resulting from vehicle traffic, 60 PPM for up to 28 minutes, and 100 PPM for up to 16 minutes).

In addition, UL standards sometimes require that dangerous condition alarms incorporate some manner of manually actuable reset button. For example, UL 2034 requires that a CO detector include a manually actuable reset button which, in effect, decreases the sensitivity of the device and turns off the alarm for a predetermined time period. If the CO concentration is maintained or continues to rise at the conclusion of the reset period (defined by UL 2034 as being a maximum of six minutes), then the alarm will be re-actuated.

UL standards often also require that dangerous condition alarm devices be marked with specific warning and/or operating instructions. For example, UL 2034 requires that a CO detector be marked with certain operating instructions which set forth a particular protocol to be followed in the event that the alarm sounds. The instructions advise the occupant to call the fire department only if someone is experiencing symptoms of CO poisoning (headache, dizziness, upset stomach, etc.). If no CO poisoning symptoms are present, the occupant is instructed to reset (silence) the detector and investigate the source of the CO.

Given the nature of the dangers protected against by such dangerous condition warning devices, it is particularly important that the sensors be reliable and relatively foolproof. This need is accentuated when the unit employs a DC power source and/or replaceable sensor unit. It is therefore important to ensure that replaceable units be installed properly, (e.g., are not reversed during installation), are in good operating condition, and that an occupant be given sufficient warning of an impending sensor or battery failure. In general, generation of a low battery warning signal is known. Examples of apparatus for generating an alarm to indicate impending battery failure in the context of a battery powered fire detector are described in U.S. Pat. No. 4,139,846 issued to Conforti on Feb. 13, 1979; U.S. Pat. No. 4,138,670 issued to Schneider et al on Feb. 6, 1979; and U.S. Pat. No. 4,138,664 issued to Conforti et al on Feb. 6, 1979.

Another source of frustration with dangerous condition detectors is the inability of the typical user to discern which of a number of detector units is generating warning signals as to impending battery or sensor failure. Conventionally, a low battery warning signal is generated by intermittent actuation of the same horn used to generate a danger condition alarm. The low battery warning signal is distinguishable from a danger condition alarm by the duty cycle and/or repetition rate. However, it is often very difficult to localize sound. This difficulty tends to be exacerbated when the units are mounted in inaccessible places such as, for example, on a cathedral ceiling, or are mounted in close proximity to other devices, such as other dangerous condition detectors (e.g., a CO detector mounted near a smoke alarm). Some detectors also include a visual indicator, such as an LED, that blinks in synchronization with the low battery audible alarm, albeit not coincidentally. However, to conserve battery power, the LED activation is held to a relatively short duration, e.g., 10 milliseconds, and the repetition rate is typically kept relatively low, e.g., one flash each 40 seconds. As a result, unless the user happens to be looking in the direction of the unit when the LED flashes or is able to correlate a 10 millisecond flash with a 10 millisecond chirp delayed by several seconds, it is difficult to identify the particular unit in distress.

It is desirable to provide a brief respite, as through a night, from a distinctive, repeating audio alarm if the battery of a battery operable dangerous condition sensor is determined to be failing, but failure is not imminent; however, if battery failure is imminent, it would be unwise to ignore the consequent alarm. It is to a feature for accommodating these contrasting conditions that the present invention is directed.

OBJECTS OF THE INVENTION

It is therefore a broad object of the present invention to provide an improved battery operable dangerous condition detection device which includes a feature for periodically assessing the integrity of the battery and provides a suitable battery-failing signal to the user if the integrity of the battery is suspect.

It is a more specific object of this invention to provide such a battery operable dangerous condition detection device in which a distinction is made between a battery which may fail after a relatively long period and one whose failure is imminent and which provides a user-actuable temporary sensor-failing signal silencing feature only for the former condition.

SUMMARY OF THE INVENTION

These and other objects of the invention are achieved in a battery operable dangerous condition warning device adapted to issue an alarm when a sensed dangerous condition exceeds a predetermined status and incorporating a monitoring device circuit including: a processor, a dangerous condition sensor, an audio annunciator such as a horn, a battery condition monitoring procedure cooperating with the processor to periodically check the integrity of the battery for detecting a first battery integrity condition in which battery failure can be expected after a relatively long period (e.g., in excess of eight hours) and a second battery integrity condition in which battery failure is imminent and replacement should be undertaken. The circuit further implements an audio battery low integrity warning generator adapted to drive the horn to issue a distinctive audio warning (e.g., a single pulse of about 10 milliseconds duration at about one minute intervals) in response to the detection of both the first and second battery integrity conditions. A manually-actuable switch coupled to the processor permits inhibiting drive to the horn for a predetermined period if the first battery integrity condition is detected; however, actuation of the manually-actuable switch after the second battery integrity condition has been detected is prevented from temporarily inhibiting the drive to the horn. A visual battery condition indicator may also be provided to identify which of a plurality of dangerous condition warning devices in a given installation is experiencing the failing battery.

BRIEF DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 3A is a schematic diagram of a suitable sensor circuit for use in an AC powered unit;

FIG. 3B is a schematic diagram of an alternative sensor circuit for use in an AC powered unit;

DETAILED DESCRIPTION OF PREFERRED EXEMPLARY EMBODIMENTS

Figure 1:
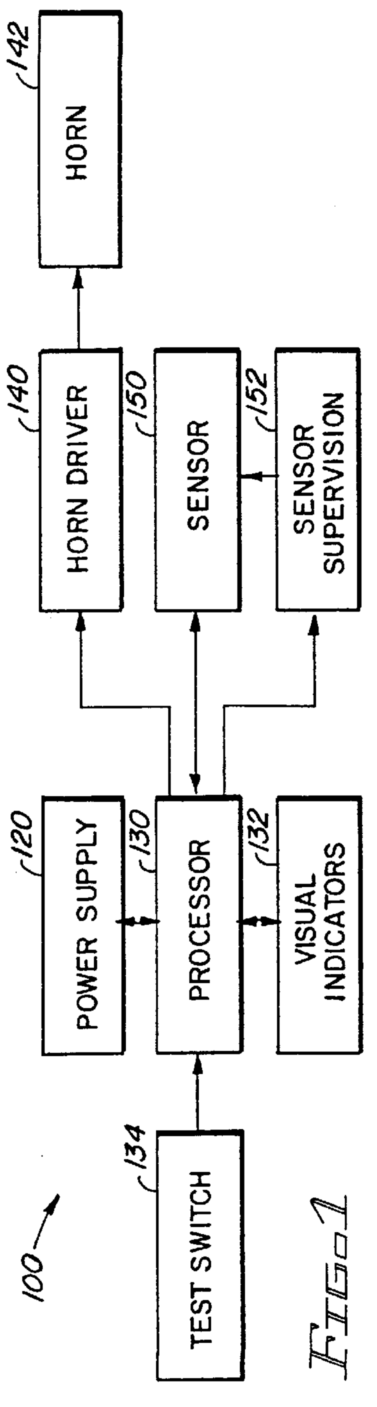
FIG. 1 is a block schematic diagram of a dangerous condition detector unit in accordance with the present invention.

Referring now to FIG. 1, a dangerous condition detector unit 100 in accordance with the present invention includes: a power supply 120; a processor 130; respective visual indicators 132; a manually actuable test/reset switch 134; a suitable audio transducer (e.g., piezoelectric horn 142) and cooperating horn driver 140; a suitable sensor 150 and a sensor supervision system 152.

Power supply 120 may be any supply capable of providing the necessary voltage levels for the various components of the system. In circumstances where AC line voltage is available, power supply 120 suitably includes a conventional diode bridge rectifier and voltage regulator devices. Battery back-up may also be provided. Alternatively, power supply 120 may employ a battery as the primary power source.

Figure 2:
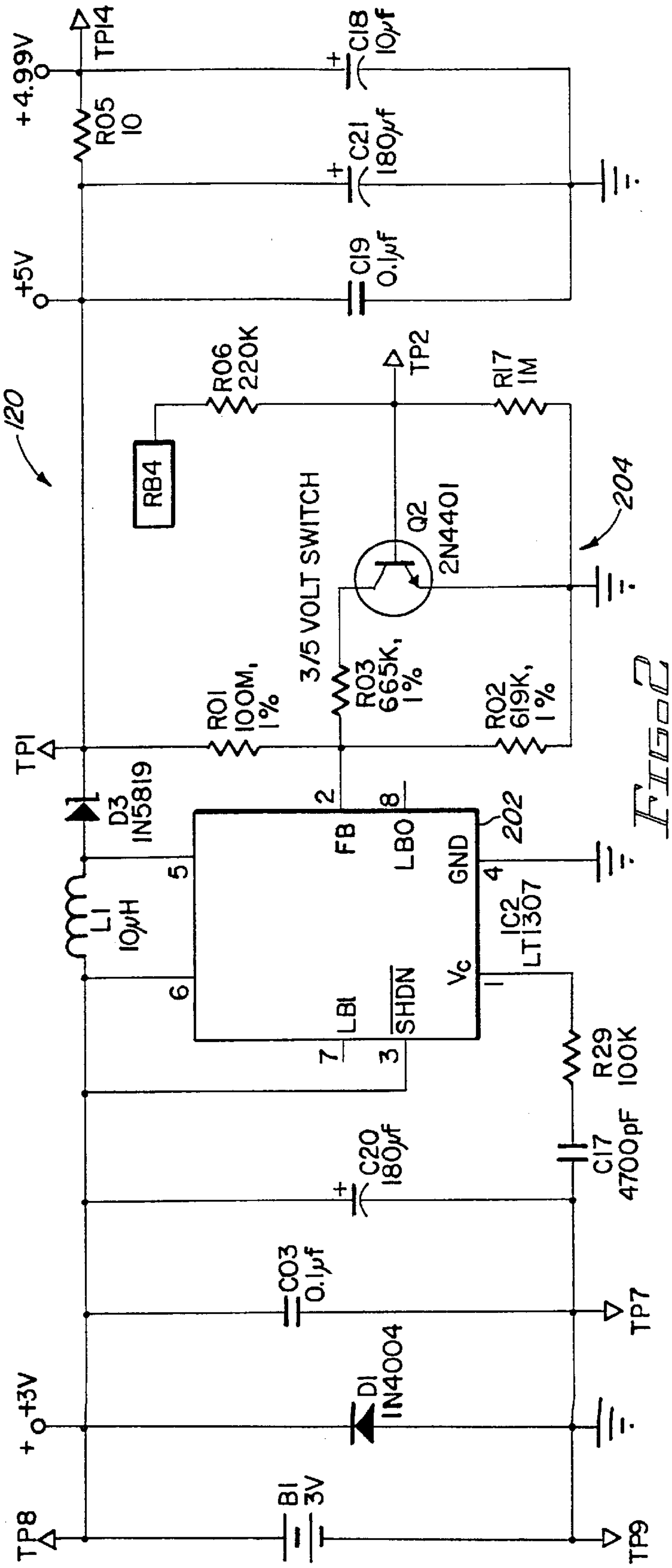
FIG. 2 is a schematic diagram of an exemplary DC power supply.

However, with the DC configuration, it is desirable that provisions be made to conserve power (battery savings) and to account for decreases in battery voltage over the life of the battery. For example, referring to FIG. 2, an exemplary DC power supply includes a battery B1 (e.g. two AA 1.5 volt alkaline cells connected to provide 3.0 volts DC), a conventional DC-to-DC converter 202 and a suitable switching circuit 202. Preferably, a diode D1 is also provided across battery B1 to prevent damage to unit 100 in the event that the battery is inserted with reversed polarity. An output capacitance (C19, C21, C18) is conventionally provided to reduce noise and ripple voltage in the output.

DC-to-DC converter 202 generates a relatively stable predetermined voltage appropriate for energizing the various components of the unit, irrespective of a relatively wide range of variation in the output of battery B1 (e.g. down to approaching 1.0 volts) as the batteries are depleted. The predetermined output voltage of DC-to-DC converter 202 is suitably stepped up from the battery voltage, e.g. to between about 3.0 v to 5.0 v, to accommodate the requirements of the various components. DC-to-DC converter 202 may be based on, for example, a Linear Technology LT1307 Single Cell Micropower Pulse Width Modulated DC/DC Converter Chip.

Switching circuit 204 selectively actuates converter 202 in accordance with control signals from processor 130 and includes a transistor Q2 disposed to selectively provide a limited current path between the feedback pin (FB; pin 2) of DC-to-DC converter 202 and ground. As will be discussed, processor 130 provides a control signal (RB4) to selectively render transistor Q2 conductive, placing resistor R03 in parallel with resistor R02 and thus pulling the FB terminal of converter 202 towards ground and, in effect, modifying the output voltage of converter 202. In essence, to conserve power, sensor 150 is monitored only for a relatively short period of predetermined duration, e.g., 30 milliseconds and is polled only periodically, e.g., approximately every 48 seconds. Converter 202 is similarly switched to a higher voltage only on a periodic basis, e.g. in conjunction with operation of sensor 150 while any of the visual indicators 132 are illuminated or during the time of horn activity 140, 142. During the period when the sensor is monitored, DC-to-DC converter 202 provides a relatively stable 5.0 volt output for application to the various components of the system. At all other times, DC-to-DC converter 202 provides an output of about 3.0 volts which is suitable for ongoing operation of the processor 130.

Sensor 150 may be any sensor compatible with the available power supply and processor which is capable of providing a suitable signal in response to designated conditions. For example, in the context of an AC line powered CO detector unit, sensor 150 may employ a conventional semiconductor sensor. More specifically, referring to FIG. 3A, sensor 150 incorporates: a semiconductor CO sensor unit 302, such as a Capteur 1CGL05ALB07; a suitable heater driver circuit 304; precision reference voltage dividers 306 and 308; and respective amplifiers 310 and 312.

Alternatively, the sensor circuit shown in FIG. 3B may be employed in an AC line powered CO detector unit. In this embodiment, the CO sensor 150 incorporates a CO sensor device 320 which is a non-replaceable semiconductor tin oxide sensor, a Figaro TGS 203 in the example. Heaters 321A and 321B are cooperatively energized to heat the CO sensor device 320 to an appropriate temperature range. Thermistor 329, disposed in the same thermal environment as the CO sensor device 320, is connected in series with precision resistor 330 between VCC and ground such that the voltage appearing at the junction is representative of the instantaneous temperature in the proximity of the CO sensor device. This signal is sent to the processor 130 as previously described. The integrity of the thermistor 329 is checked periodically (typically, every few seconds) to ensure its integrity; if its resistance is determined to be out of range, as when it has opened or shorted, then the processor will initiate a Fault mode.

The heaters 321A, 321B are energized by the cooperation of PNP power transistor 322 and NPN power transistor 326. Transistor 322 is biased normally-off by pull-up resistor 323 connected between the base of the transistor and VCC. Conversely, transistor 326 is biased normally on by pull-up resistor 328 connected between the base of the transistor and VCC. Thus, current flow through the heaters 321A, 321B is controlled by applying, through isolation resistor 324, a low signal to the base electrode of transistor 322 and allowing a high signal to be applied to the base electrode transistor 326 through resistor 328, thereby establishing a current path from VCC through the heater 321A, through transistor 322, through heater 321B, through power resistor 327 (e.g., 8.2 Ω, 1 W) and through transistor 326 to ground. Resistor 325 is of much higher resistance (e.g., 3.92 KΩ) than power resistor 327 such that negligible heater current flows through it.

The current through the heaters is subject to pulse-width modulation by periodically applying a low signal to the base of the transistor 322. In the example, a 73% duty cycle is used for a high heat purge and a 13% duty cycle for a low heat mode prior to reading the CO sensor device 320.

The CO sensor device 320 is read by placing a low signal on the base of transistor 326 to turn it off and a high signal on the base of transistor 322 to turn it off, thus de-energizing the heaters 321A, 321B. In this state, the CO sensor device 320 is disposed in series with resistor 325 between VCC and ground such that the voltage appearing at their junction is indicative of the resistance of the CO sensor device which is, in turn, representative of the ambient CO concentration. (The resistance of the tin oxide type semiconductor sensor device decreases with an increase in CO concentration such that a higher voltage appearing at the above-mentioned junction denotes a corresponding increase in CO concentration.) This signal is sent to the processor as previously described.

Figure 4:
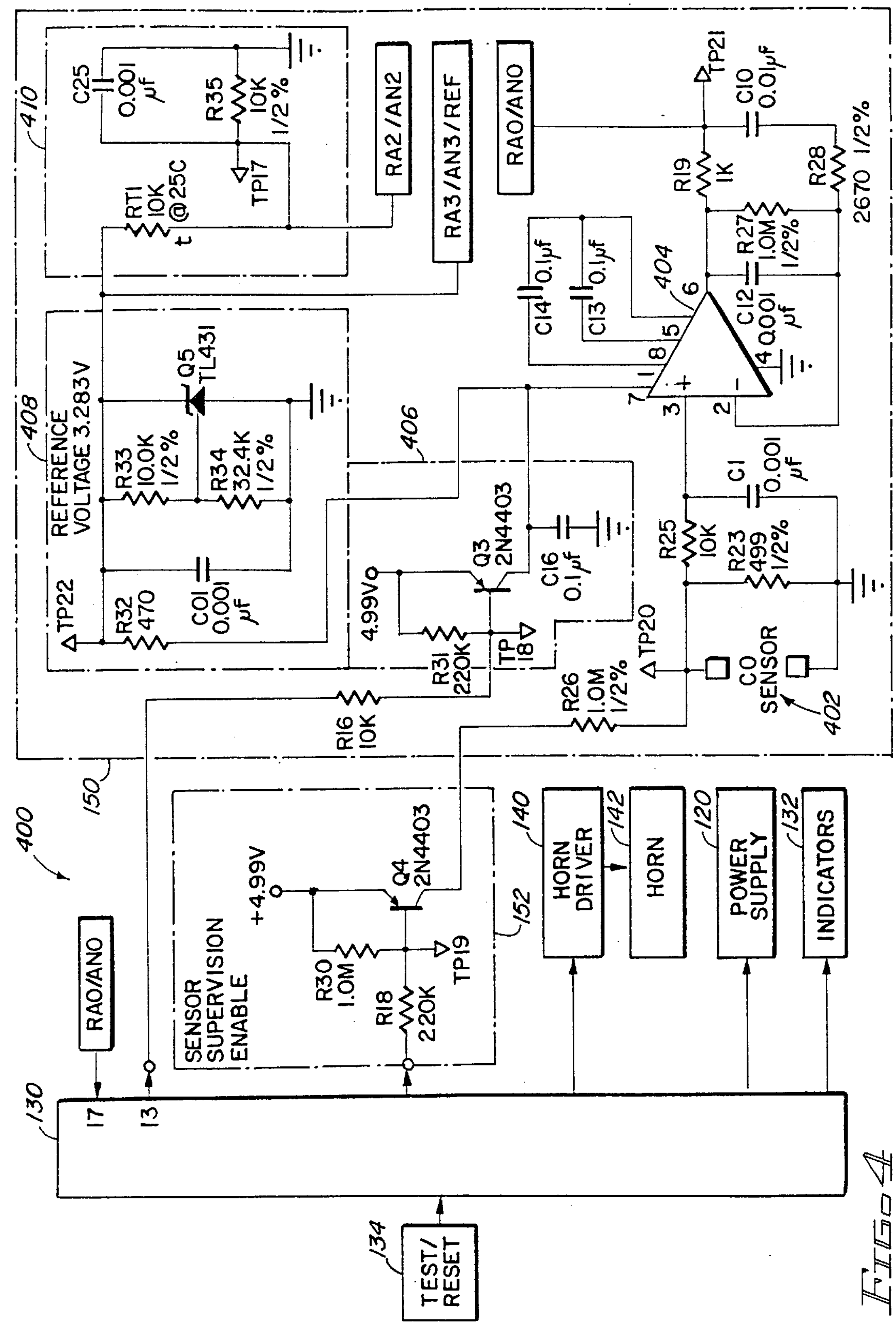
FIG. 4 is a block/schematic diagram of a battery powered CO detector unit in accordance with various aspects of the present invention.

In a battery powered CO detector unit, sensor 150 preferably employs a small low-power electrochemical sensor device. Referring to FIG. 4, battery powered CO detector unit 400 employs a sensor 150 incorporating: an electrochemical CO sensor device 402; a load resistor R23 of predetermined resistance; an amplifier 404; a suitable sensor/reference enable circuit 406; reference voltage generator 408; and temperature sensor circuit 410.

CO sensor device 402 is preferably a two terminal device that generates a signal (voltage or current) indicative of substantially instantaneous exposure to carbon monoxide. In essence, the CO sensor device 402 is in the nature of a battery combined with a capacitor, with respective parallel conductive plates separated by an electrolyte. The conductive plates are treated with a catalyst, e.g., platinum black, to provide a large surface area. When a carbon monoxide molecule impinges upon the detector, the CO is, in simplistic terms, oxidized, generating carbon dioxide ($CO_2$) plus two electrons. The resulting electron flow effects a current indicative of the instantaneous level of ambient CO, and the current is applied to load resistance R23 to develop a voltage. Load R23 is suitably a relatively low resistance, high precision resistor (e.g., 499 ohms, ½%).

The currents and voltages generated and developed in this manner are relatively low level. For example, the voltage developed across the precision resistor R23 is on the order of 1.8 millivolts per 100 PPM of CO present. Accordingly, amplifier 404 is employed to generate a signal (RA0/AN0) which is both indicative of the instantaneous level of CO and of a level compatible with processor 130. Amplifier 404 is preferably a high gain operational amplifier circuit such as a chopper amplifier.

As previously noted, it is particularly desirable to conserve power in battery powered units. Accordingly, amplifier 404 is preferably activated only on an intermittent basis., e.g., activated for a relatively short period, such as 30 milliseconds, at periodic intervals such as about every 48 seconds. To this end, sensor 150 preferably includes sensor/reference enable circuit 406 for selectively activating amplifier 404 in response to signals from processor 130. Sensor enable circuit 406 employs a transistor Q3 as a switch to control the application of power from supply 120 to amplifier 404 and reference voltage generator 408. Reference voltage generator 408 develops a reference signal (RA3/AN3/REF) provided to processor 130 for use in connection with analog-to-digital conversion of the output RA0/AN0 (the signal indicative of the ambient CO level) of amplifier 404.

Figure 5:
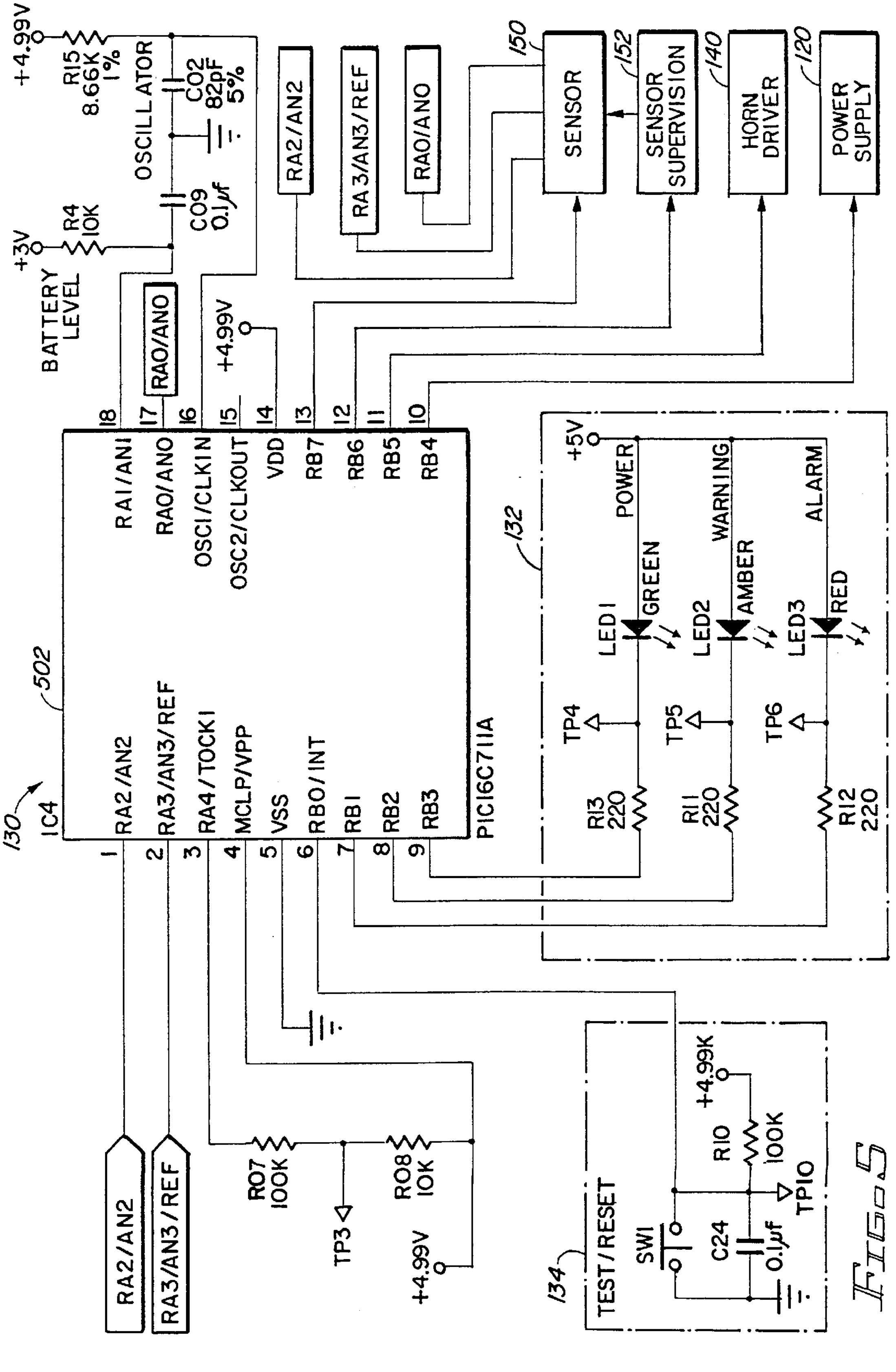
FIG. 5 is a block/schematic diagram of the system of FIG. 4 showing a processor, a test reset switch and visual indicators in more detail.

Referring now to FIGS. 4 and 5, a processor 130 suitable for use in a DC powered CO detector includes a conventional, commercially available processor 502. Processor 502 may be, for example, a Microchip type PIC16C711A which incorporates an internal read only memory (e.g. an electronically programmable memory or EPROM), a random access memory (RAM), an analog-to-digital (A/D) converter and both analog and digital input/output (I/O) facilities.

Processor 502 is receptive of (in addition to clock and power signals): CO level signal RA0/AN0 from amplifier 404 (applied at pin 17), indicative of the level of ambient carbon monoxide; reference voltage RA3/AN3/REF from circuit 408 (applied at pin 2) used in connection with A/D conversion of CO level signal RA0/AN0; a signal RA2/AN2 indicative of temperature from temperature compensation circuit 410 (applied at pin 1); a suitable interrupt signal RB0/INT from test/reset switch 134 (applied at pin 6); and a signal RA1/AN1 indicative of the battery level (applied at pin 18). As will be explained further below, reference voltage RA3/AN3/REF from circuit 406 (applied at pin 2) is, in effect, synchronized with the operation of amplifier 404.

Processor 502, in turn, provides control signals: to sensor 150 (pin 13, RB7); to sensor/reference enable circuit 406 (pin 13, RB7) to periodically effect actuation of amplifier 404 and reference generator 408 and thus monitor the condition of sensor 402; to sensor supervision circuit 152 (pin 12, RB6) to effect a periodic test of sensor 150; to power supply 120 (pin 10, RB4) to selectively modify the output of converter 202 and effect battery savings; and to horn driver 140 (pin 11; RB5) and visual indicators 132 (pins 7–9, RB1–RB3) to generate appropriate status, warning and alarm signals indicative of defined CO exposure conditions (alarm or warning depending upon the concentration level and duration of exposure) and to generate defined battery or sensor failure conditions. As shown in FIG. 5, visual indicators 132 constitute respective light emitting diodes LED1, LED2 and LED3 of diverse colors (e.g., green, yellow (amber) and red, respectively).

In general, distinctive audio-visual indicia sequences are generated in response to exposure to CO at various levels for a first (warning) time period and a second, longer (alarm) time period as well as in response to the detection of low battery or failing sensor conditions. In addition, the visual indicia and/or horn are momentarily activated in response to actuation of a test/reset switch 134.

Respective distinctive warning and alarm indicia are generated in response to CO events; that is, exposure to predetermined levels of CO for predetermined periods of time. Exposure to a given level of CO for a first time period results in generation of a warning indicia while exposure for a second longer predetermined period of time results in generation of an alarm as, for example, set forth in the following Table 1:

TABLE 1

| CO LEVEL (PPM) | WARNING TIME | ALARM TIME |
|---|---|---|
| Less than 75 | No response | No response |
| 75–125 | 16 minutes | 36 minutes |
| 125–175 | 10 minutes | 20 minutes |
| 175–300 | 7 minutes | 15 minutes |
| Greater than 300 | 4 minutes | 8 minutes |

The various indicia sequences are chosen to provide an appropriate level of intrusiveness and distinctiveness (as between one another). Thus, normal operational status is indicated by periodically flashing green LED 1 on a periodic basis such that, for example, LED1 would be activated for a relatively short period (such as about 10 milliseconds) about every 60 seconds.

Because a DC dangerous condition warning device relies upon battery power and an AC dangerous condition warning device typically employs a battery backup, careful consideration should be given to conserving battery energy during audio visual events. Thus, for example, in the present embodiments, audio annunciator activation (except for alarm conditions) should preferably be limited to on-times of no more than about 50 milliseconds, more preferably no more than about 20 milliseconds and most preferably about 10 milliseconds at intervals of at least about 30 seconds and preferably about one minute. Similarly, visual indicia (LEDs in the examples) employed in condition indicating modes are preferably limited to on-times no more than about 50 milliseconds, preferably no more than about 20 milliseconds and most preferably about 10 milliseconds.

Exemplary alarm indicia sequences are set forth in Table 2.

TABLE 2

| CONDITION | LED ACTUATION | HORN ACTUATION |
|---|---|---|
| Normal Standby Operation (sensing CO) | LED1 (Green) activated for a single pulse of 10 ms duration, at one minute intervals. | None |
| Battery Fault (relatively eminent battery failure) | LED1 (Green) activated in a repeating sequence of bursts of a five spaced pukes of 10 ms duration (10 ms ON, 500 ms OFF) repeated at one minute intervals. | Activated for a single pulse of 10 ms duration slightly before or substantially contemporaneous with the first LED pulse of each burst. |
| Device Fault (relatively eminent sensor degradation) | None | Activated in a repeating sequence of bursts of three 10 ms duration pulses at 500 ms intervals (10 ms ON, 500 ms OFF, 10 ms ON, 500 ms OFF, 10 ms ON) repeating at five minute intervals. |
| CO Warning Condition | LED2 (Yellow) activated in a repeating sequence of 10 ms pulses at one second intervals (10 ms ON, approximately 990 ms OFF) | Activated in a repeating sequence of 250 ms pulses at 30 second intervals, for the duration of the condition. |

TABLE 2-continued

| CONDITION | LED ACTUATION | HORN ACTUATION |
|---|---|---|
| | for the duration of the condition. | |
| CO Alarm Condition | LED3 (Red) activated in a repeating sequence of 10 ms pulses at 100 ms intervals (10 ms ON, approximately 90 ms OFF) for the duration of the condition. | Activated in a repeating sequence of e.g., 8 second duration alarm tones at 16 second intervals (8 seconds ON, 8 seconds OFF), for the duration of the condition. |

Processor 130 controls the operation of the unit by executing a predetermined sequence of steps to: appropriately test various of the system components such as sensor 150 and power supply 120; actuate amplifier 404 and reference generator 408 and sample the output of sensor 150; and direct the generation of various audible and visual indications of ambient conditions and system operation. Processor 130 also institutes specified process sequences in response to designated interrupt signals applied to the processor upon the occurrence of predetermined conditions such as the actuation of test/reset switch 134. Any suitable program for effecting such operations may be employed.

The various components of detector 100 are maintained within a housing adapted for appropriate disposition and/or mounting. In accordance with various aspects of the present invention, the housing preferably incorporates certain features, depending upon the nature of the sensor type and power source employed. For example, as will hereinafter be described in more detail, both line operated AC and DC (battery powered) units employ a test/reset switch 134 specifically configured to facilitate actuation with a pole (e.g., a broom handle) when the unit is mounted on the ceiling. Both the AC and battery powered units also provide for long term retention of protocol instructions with the unit for ongoing ready access.

Battery powered units preferably also include a battery lock out feature that precludes the device from being mounted without batteries in place. Where replaceable "button shaped" sensors, such as CO detector 402, are employed, a mechanism may be provided to prevent inadvertent reversing of the CO sensor. AC powered embodiments are preferably provided with a rotatable plug to permit the unit to be plugged into an electrical outlet at various angles relative to the axis of the outlet.

Battery Powered Detector

Figure 6:
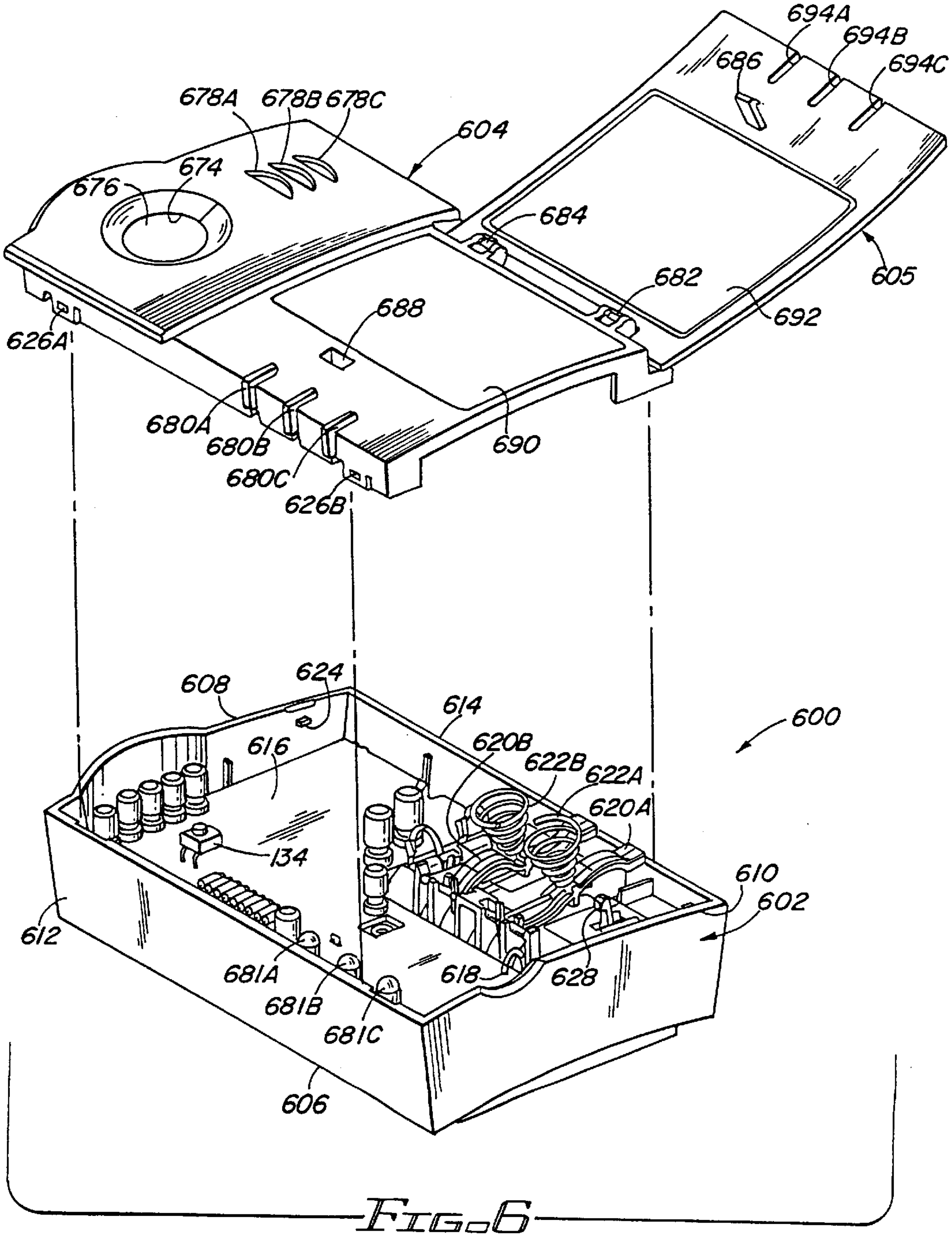
FIG. 6 is a partially exploded perspective diagram of the housing for a DC powered CO detector in accordance with various aspects of the present invention.
Figure 7A:
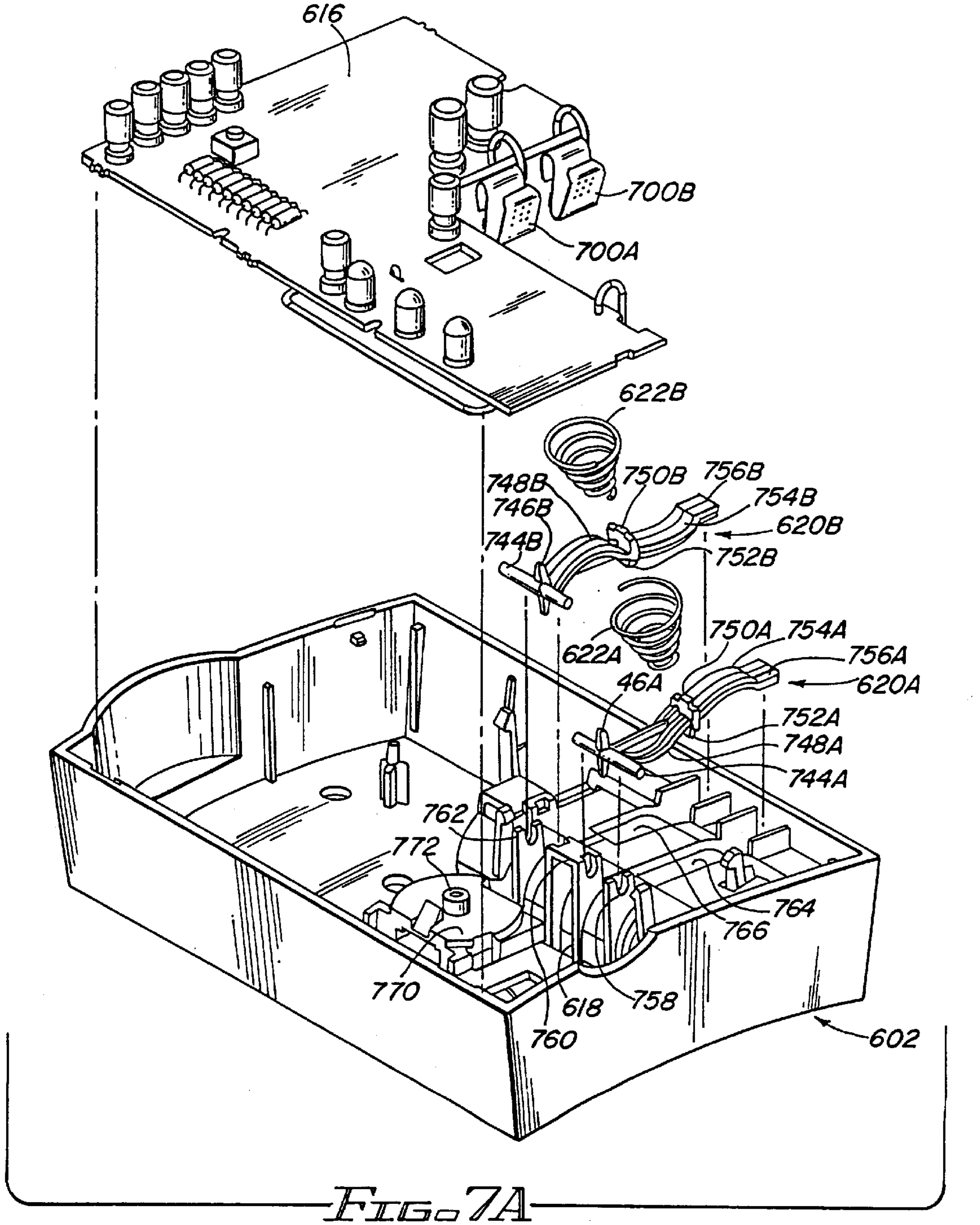
FIG. 7A is an exploded view of the base 602 shown in FIG. 6.

Referring now to FIGS. 6 and 7A, a housing 600 for a battery operated CO detector suitably includes: a base 602, a cover 604 shown in a removed position and a front door 605 pivotally mounted on cover 604. Base 602 is made of plastic material and has a generally rectangular bottom 606, end walls 608 and 610 and side walls 612 and 614.

In assembly, cover 604 is received on the open end of base 602 for a snap-together connection therewith. An extension 624 extends inwardly from wall 608 for engaging a corresponding opening (not shown) on cover 604. Two similar extensions (not shown) extend inwardly from side wall 612 to engage openings 626A and 626B in cover 604. Furthermore, a hook 628 extending from battery housing 618 engages a corresponding opening (not shown) in cover 604.

Base 602 houses: a circuit board assembly 616, a battery housing 618 molded therein, lock out pivot arms 620A and 620B pivotally attached to battery housing 618 and conical springs 622A and 622B having reduced diameter ends abutting lock out arms 620A and 620B, respectively. As best seen in FIG. 7A, circuit board assembly 616 includes battery contacts 700A and 700B for providing contact with a battery power source (not shown).

Lock out pivot arms 620A and 620B (collectively referred to as arms 620) are employed as battery presence sensing members to prevent detector unit 600 from being mounted without batteries. Lock out arms 620 are substantially identical, each generally "S" shaped and having a pivot member 744, a stabilizer 746, an arcuate section 748, projections 750 and 752, an arcuate section 754 and an end portion 756. Lock out arms 620 are pivotally mounted within the battery housing 618. Respective pivot support members 758, 760 and 762, each including arched recesses, are provided for receiving pivot members 744 of lock out arms 620. Lock out arm 620A is pivotally mounted on support members 758 and 760, and lock out arm 620B is pivotally mounted on support members 760 and 762. Elongated horizontal slot 764 is provided in battery housing 618 and is disposed and appropriately shaped and sized to receive arcuate section 748A, projection 750A and arcuate section 754A of lock out arm 620A. Similarly, horizontal slot 766 is disposed and appropriately shaped and sized to receive arcuate section 754B, projection 752B and arcuate section 754B of lock out arm 620B.

Figure 10A:
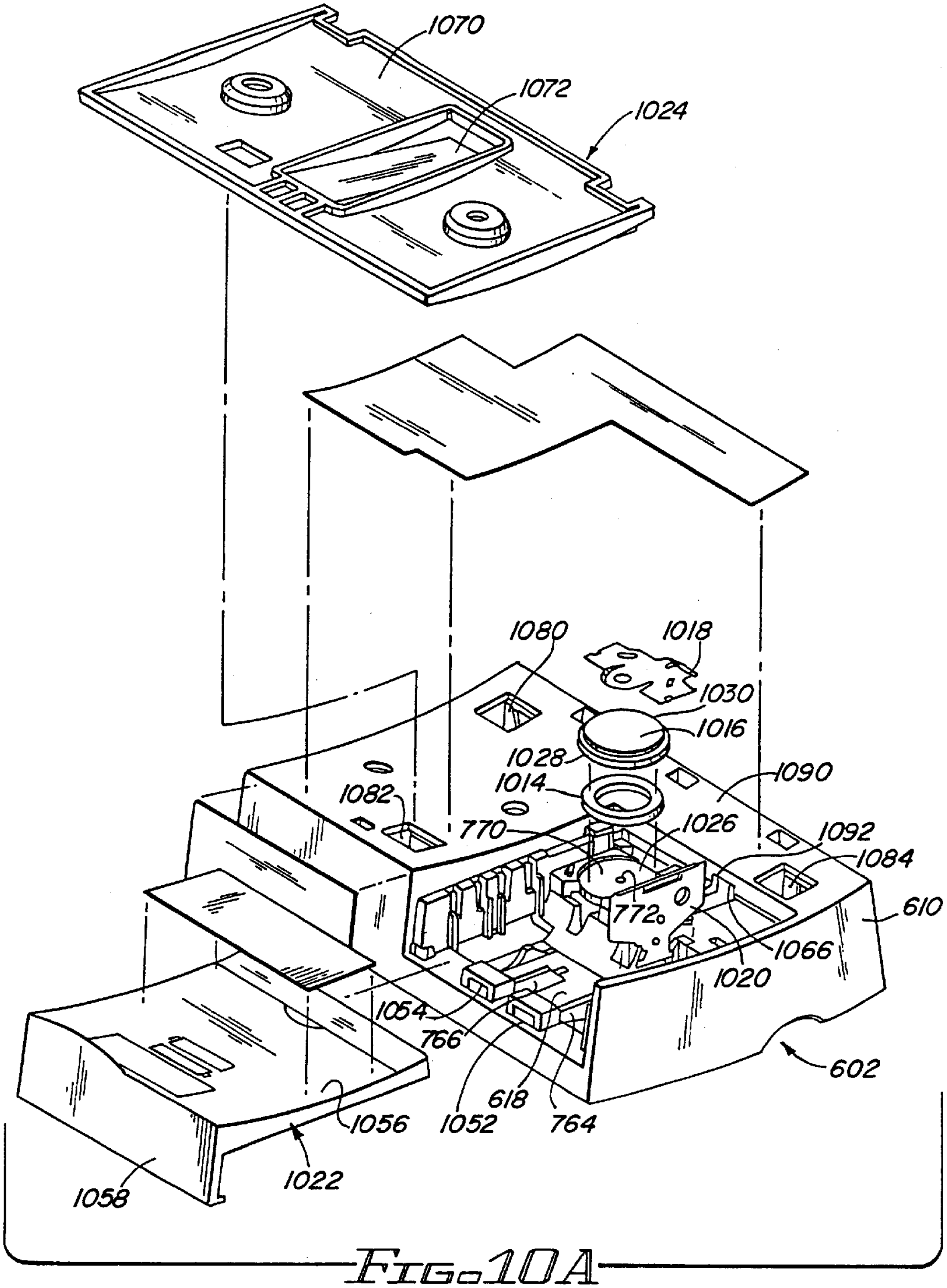
FIG. 10A is an exploded perspective view of the mounting side of the base of the unit of FIG. 6 illustrating a replaceable CO sensor unit.

Still referring to FIG. 7A and also to the inverted view of FIG. 10A, base 602 further encloses a cylindrical sensor housing 770 incorporating a circular vertical capillary 772 for maintaining diffusion of gas molecules therethrough to a sensor 1016 mounted in the sensor housing 770 relatively constant to detect the presence of carbon monoxide. Thus, it will be seen that the aperture of the capillary 772 extends from the upper side of the base 602 (FIG. 7), to a region immediately above the sensor 1016 (best seen in the inverted view of FIG. 10A) which is contained within the sensor housing 770 (disposed on the lower side of the base 602) such that the ambient air is fed directly to the sensor substantially only through the capillary 772 at a controlled rate. The provision of the capillary results in more consistent and meaningful readings from sample to sample and also diminishes the disruptive effects of transient, but contextually unimportant, CO concentration spikes such as might be encountered if an internal combustion engine or other CO source is briefly brought near the detector. Preferably, the base 602 and the sensor housing 770 constitute a unitary molded plastic structure.

Figure 9:
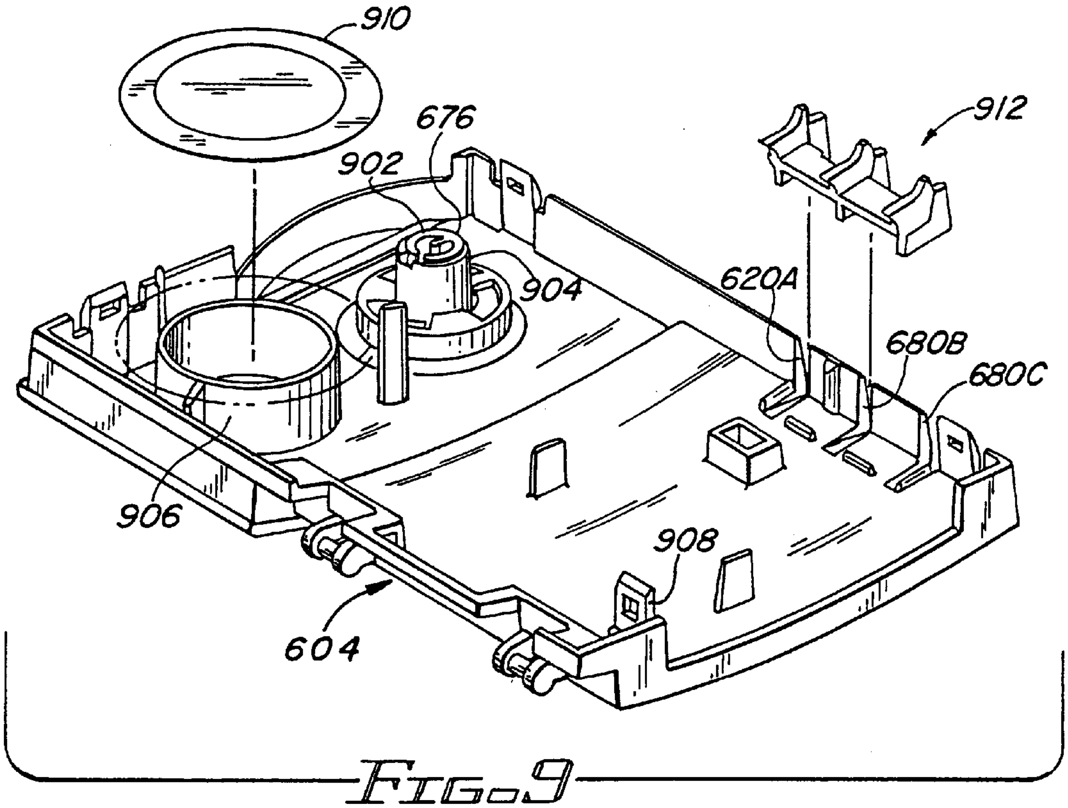
FIG. 9 is an exploded perspective of the interior side of the cover of the unit of FIG. 6.

Referring again to FIG. 6, the front of cover 604 includes a round recess 674 for receiving a button 676, precision apertures 678A, 678B and 678C for facilitating the broadcasting of an alarm sound and vertical slots 680A, 680B and 680C for receiving a light pipe (912; FIG. 9). The light pipe transmits to the front of cover 604 the light signals from circuit board assembly 616 and, more particularly, from light indicators 681A, 680B and 680C that indicate whether the detector is on or off, whether the level of carbon monoxide in the area being monitored is increasing or whether the level is high, respectively.

Front door 605 is pivotally mounted on cover 604 by pivot assemblies 682 and 684. In the closed position, door 605 locks on cover 604 via a hook 686 which engages opening 688. Instruction labels (not shown) are placed on label surfaces 690 and 692 of cover 604 and door 605, respectively, with appropriate instructions and protocol regarding, among other things, the status of the detector, the replacement of the battery or the sensor and steps to be taken when the alarm activates. Door 605 further includes slots 694A, 694B and 694C which are aligned with slot 680A, 680B and 680C when door 605 is closed.

Figure 7B:
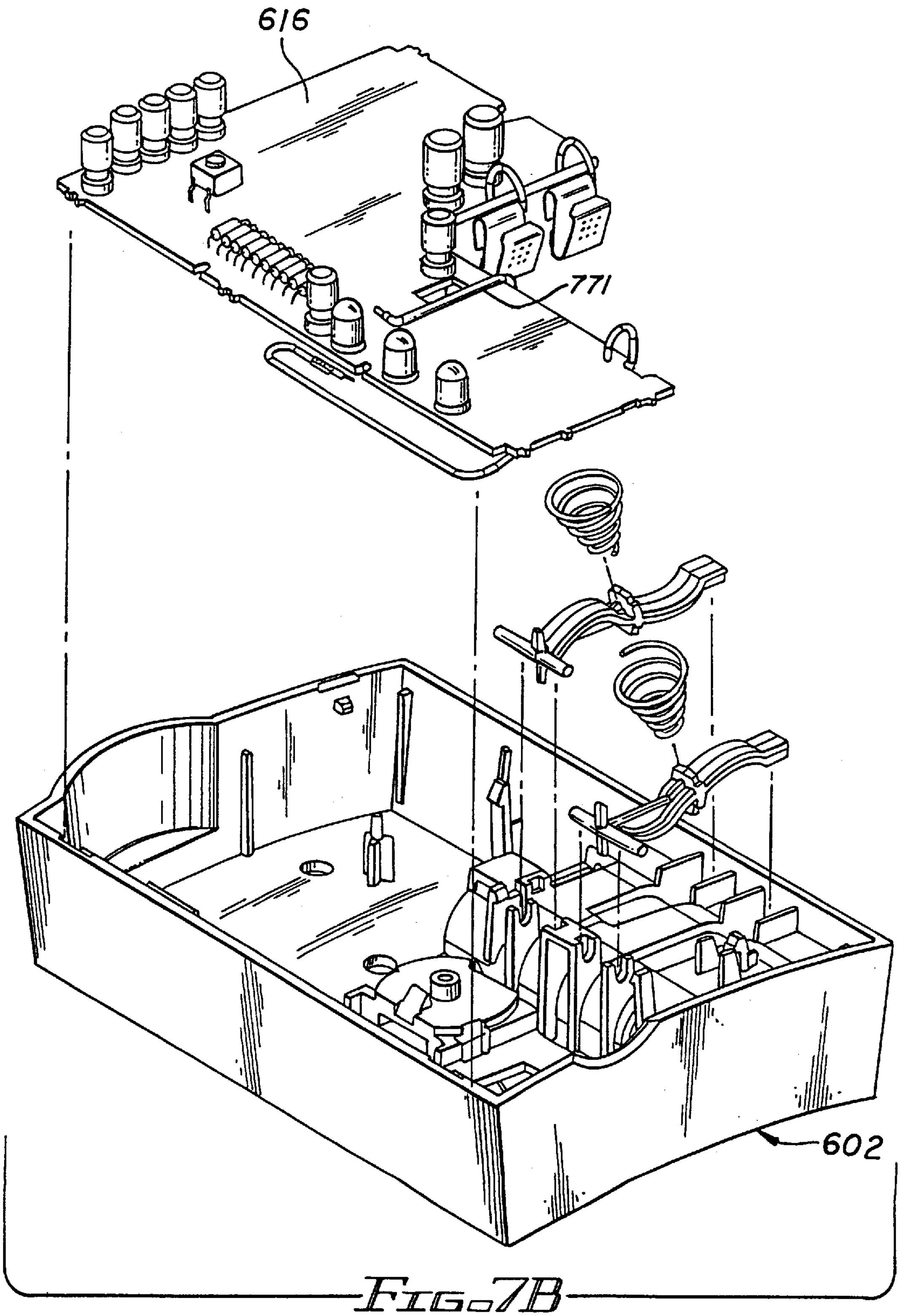
FIG. 7B is an exploded view of the base 602 shown in FIG. 6 in a slightly revised configuration adapted to accommodate a non-replaceable CO sensor unit.

FIG. 7B illustrates a slightly revised configuration of the base 602 adapted to accommodate a non-replaceable CO sensor unit. In this version of the base 602, a wire 771 has been added to the printed circuit board 616 to couple to the non-replaceable CO sensor unit to be discussed below in conjunction with FIG. 10B.

Figure 8:
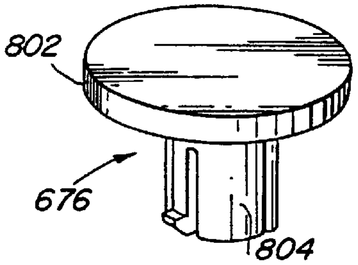
FIG. 8 is a perspective view of a test/reset button.

Referring to FIG. 8, button 676 includes a head 802 and a reduced diameter portion 804. Head 802 is sufficiently large to facilitate activation of button 676 by a broom stick or the like in order that the button 676 of a ceiling (or other remotely) mounted unit can be readily actuated without the need to employ a ladder or other expedient to reach the unit. As will be discussed below, pressing button 676 actuates test/reset switch 134.

Attention is now directed to FIG. 9 in which it will be seen that the back (interior) side of cover 604 includes a cylindrical extension 904, a rim 906, and an aperture 908. With reference to FIGS. 6–9, aperture 908 engages hook 628 (FIG. 6) when the cover is attached to base 602 and slots 680A, 680B and 680C. Cylindrical extension 904 is appropriately sized to receive reduced diameter portion 804 of button 676, so that button 676 can activate switch 134 on circuit board assembly 616 (shown in FIGS. 6 and 7) when detector 600 is in service. The bottom of rim 906 includes apertures 678A, 678B and 678C (shown in FIG. 6). A horn 910, shown prior to assembly with cover 604, securely rests on the mouth of rim 906 and to contact circuit board assembly 616 (shown in FIGS. 6 and 7) so that it can be activated therefrom and to broadcast the alarm. A light pipe 912, also shown prior to assembly, is constructed of clear polystyrene material and is configured for insertion into slots 680A, 680B and 680C.

Figure 12:
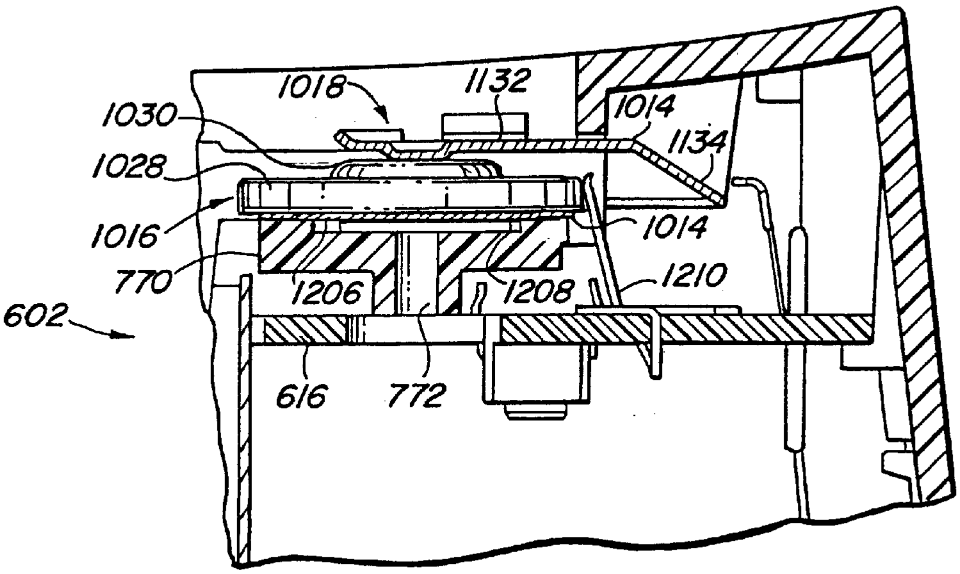
FIG. 12 is a partial cross section of the base of the embodiment of FIG. 6 showing a button type sensor in place.

Referring now to FIGS. 10A and 12, CO sensor 1016 is generally cylindrical and is secured underlying correspondingly generally cylindrical sensor housing or receptacle 770 and disposed to receive gas molecules diffusing through capillary 772. Receptacle 770 is dimensioned to closely receive sensor 1016 into its open upper end. Sensor 1016 is, in this embodiment, preferably a generally flat round element (e.g. button shaped) with an anode 1030 and cathode 1028. Cathode 1028 preferably is of increased diameter, corresponding to the outer periphery of the sensor 1016, relative to anode 1030 and constitutes both the electrically conductive lower portion and outer periphery of the sensor. Anode 1030, electrically insulated from cathode 1028, is disposed within the sidewalls of cathode 1028, forming the top of the sensor cell.

Figure 11:
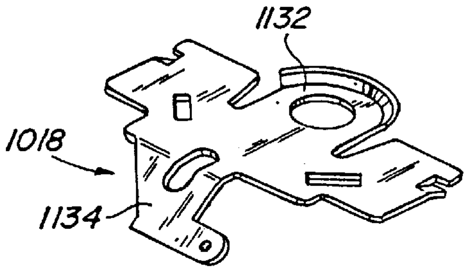
FIG. 11 is a perspective view of a top sensor contact employed in the embodiment of FIG. 6.

As best seen in FIGS. 10A and 12, sensor housing 770 includes a recess 1026, suitably concentric about the mouth of capillary 772, which is generally configured in accordance with sensor 1016, e.g., is substantially round for receiving a resilient gasket 1014. A sensor contact mechanism is employed to secure sensor 1016 in place and to prevent inadvertent reversal of sensor 1016 during mounting. Referring now to FIGS. 10A and 11–13, electrical contact to sensor 1016 is effected by top and side contacts 1018 and 1210. As best seen in FIG. 11, top sensor contact 1018 includes a substantially flat portion 1132 and a side extension 1134, forming an angle therewith.

When assembled, flat portion 1132 is slidingly inserted into and retained within respective slots on opposite walls of sensor housing 770. Sensor 1016 is received under flat portion 1132 of the top contact. Once the sensor is inserted in place and correctly positioned, flat portion 1132 abuts the top end of sensor 1016 and biases sensor 1016 against gasket 1014 to form a seal therebetween and a chamber defined by the lower surface of sensor 1016, gasket 1014 and surface 1026.

According to the present embodiment of the invention, the upper, decreased diameter portion 1030 of sensor 1016 constitutes an anode and the lower, increased diameter portion 1028 constitutes a cathode. In the correctly assembled position, contact 1018 is in contact with sensor anode 1030, and side extension 1134 is connected to a wire (not shown) that connects to the positive side of circuit board assembly 616. Furthermore, in the correctly assembled position, side sensor contact 1210 is mounted on the circuit board assembly 616 to abut lower increased diameter portion 1028 (cathode) of the sensor 1016. In that position, the side sensor contact is also in electrical contact with the negative side of the circuit board assembly 616, thereby providing electrical contact between increased diameter portion 1028 and circuit board assembly 616.

Figure 13:
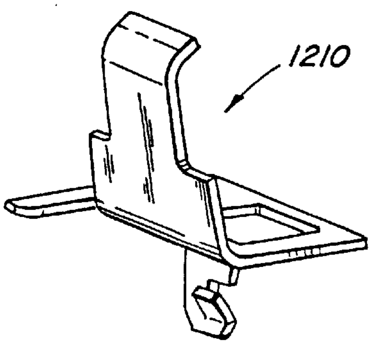
FIG. 13 is a perspective view of a side sensor contact employed in the embodiment of FIG. 6.

Referring particularly now to FIG. 12, there is shown a partial cross section of base 602 illustrating sensor housing 770 having surface 1206 and capillary 772 extending therethrough, gasket 1014 and sensor 1016 being biased against gasket 1014 by top sensor contact 1018 and forming a chamber 1208 therebetween with surface 1206 and gasket 1014. Increased diameter portion 1028 abuts a side sensor contact 1210 which is electrically connected to the negative side of circuit board assembly 616 and decreased diameter portion 1030 abuts top sensor contact 1018 which is electrically connected to the positive side of circuit board assembly 616. A perspective view of side sensor contact 1210 is shown in FIG. 13.

It should be noted that, because of the design of sensor 1016 and the positioning of top sensor contact 1018 and side sensor contact 1210, if sensor 1016 is positioned in sensor housing 770 upside down, side sensor contact 1210 will still connect with increased diameter portion 1028, and top sensor contact 1018 will also connect with increased diameter portion 1028 via the electrically conductive lower portion, but the decreased diameter portion 1030 will not be floating. Thus, the increased diameter portion 1028 will cause the contacts 1018 and 1210 to be at the same potential; i.e., will short them out. Circuit board assembly 616 will detect that condition and issue an alarm to notify the user of the faulty installation.

Figure 14:
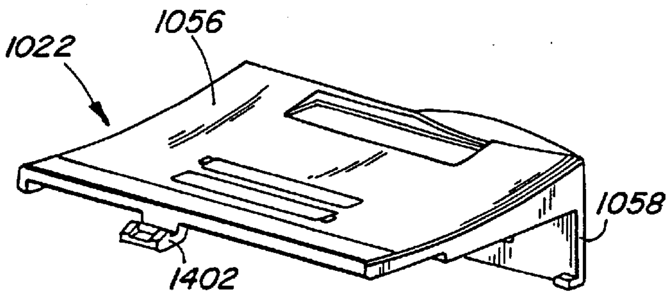
FIG. 14 is a perspective view of a battery door employed in the embodiment of FIG. 6.
Figure 15:
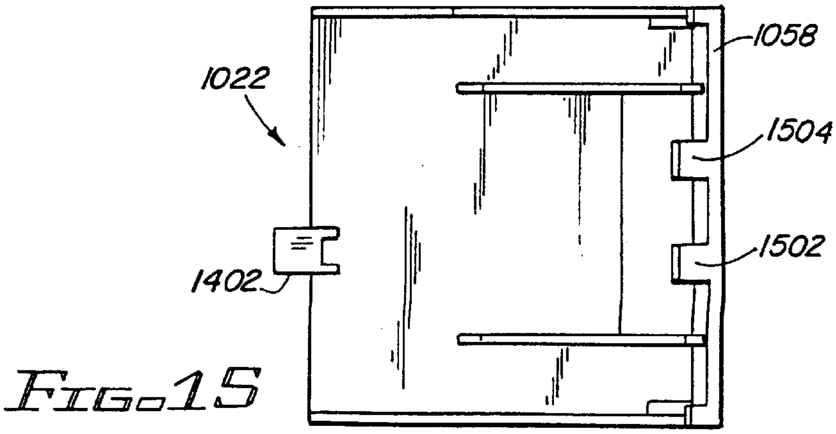
FIG. 15 is a bottom view of the battery door shown in FIG. 14.

Referring again to FIG. 10A with reference also to FIGS. 6 and 7A, battery housing 618 is configured to house two generally cylindrical batteries (not shown in FIG. 10A) and battery contact 1020 which is slidingly inserted into an appropriate slot (not shown in FIG. 10A) in the interior of end wall 610 to provide contact between the two batteries. The bottom of battery housing 618 is open to slots 764 and 766, previously described. Base 602 further includes interlock openings 1052 and 1054 which are aligned with slots 764 and 766, respectively. Battery housing cover or door 1022 includes a base 1056 and a substantially vertical wall 1058 extending from one end of base 1056. Referring also to FIG. 14, battery door 1022 has a hook 1402 extending from base 1056. As shown in FIG. 15, battery door 1022 also has projecting members 1502 and 1504 inwardly extending from wall 1058.

Referring to FIGS. 10A, 14 and 15, in order to fully close the back of base 602 with battery door 1022, hook 1402 must be snappingly received in opening 1066 and projecting tab members 1502 and 1504 must be fully received in openings 1052 and 1054, respectively. If there is an obstruction in opening 1052 or 1054, battery door 1022 will not fully close. According to the present invention, appropriate apparatus is provided, as described hereinafter, to prevent battery door 1022 from closing if both batteries are not placed in battery housing 618.

Figure 16:
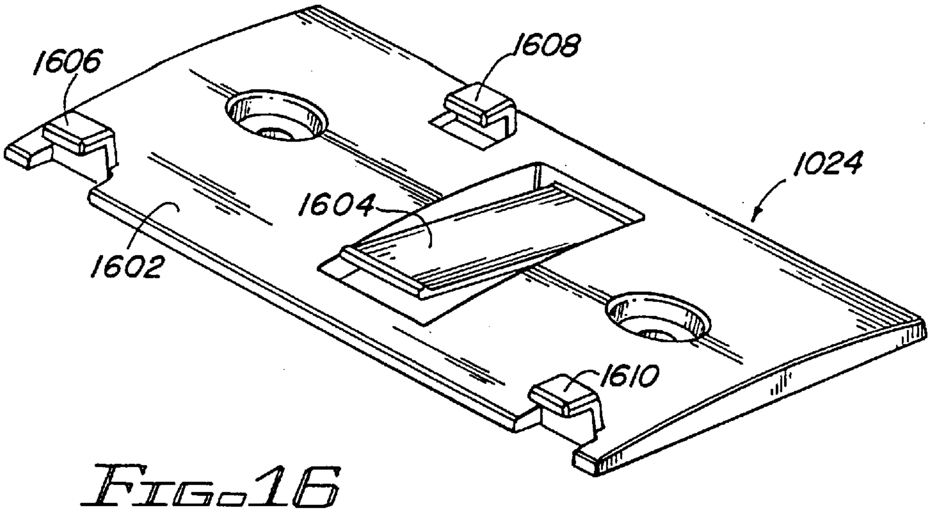
FIG. 16 is a perspective view of the mounting bracket of the embodiment of FIG. 6.

Referring now to FIGS. 10A and 16, mounting bracket 1024 includes a generally flat section 1602, a spring member 1604 and hooks 1606, 1608 and 1610 which are respectively receivable in openings 1080, 1082, 1084 on base 602. Bracket 1024 is suitably designed so that bracket 1024 will not fully engage base 602 if battery door 1022 is not fully closed and thus functions as a lockout member. More particularly, if battery door 1022 is not fully closed so that it is substantially even with upper surface 1090 of base 602, spring member 1604 abuts wall 1092 and prevents bracket 1024 from fully engaging base 602. If battery door 1022 is fully closed, battery door 1022 sufficiently biases spring member 1604 to enable it to advance past wall 1092, thereby allowing bracket 1024 to fully engage base 602.

Referring to FIGS. 6, 7A, 10A and 15, when cover 604 is received on the open end of base 602 for a snapping connection therewith, it causes conical springs 622A and 622B to compress against and to push lock out arms 620A and 620B into slots 764 and 766, respectively. If there are no batteries in battery housing 618, conical springs 622A and 622B bias lock out arms 620A and 620B to positions at which ends 756A and 756B obstruct openings 1052 and 1054 to prevent battery door 1022 from fully closing. If either battery is missing, one of the two lockout arms 620A and 620B will continue to obstruct one of the two openings 1052 and 1054, thereby preventing the full closure of battery door 1022. If both batteries are in place, the batteries abut portions 748A and 748B and prevent ends 756A and 756B from obstructing openings 1052 and 1054.

Figure 10B:
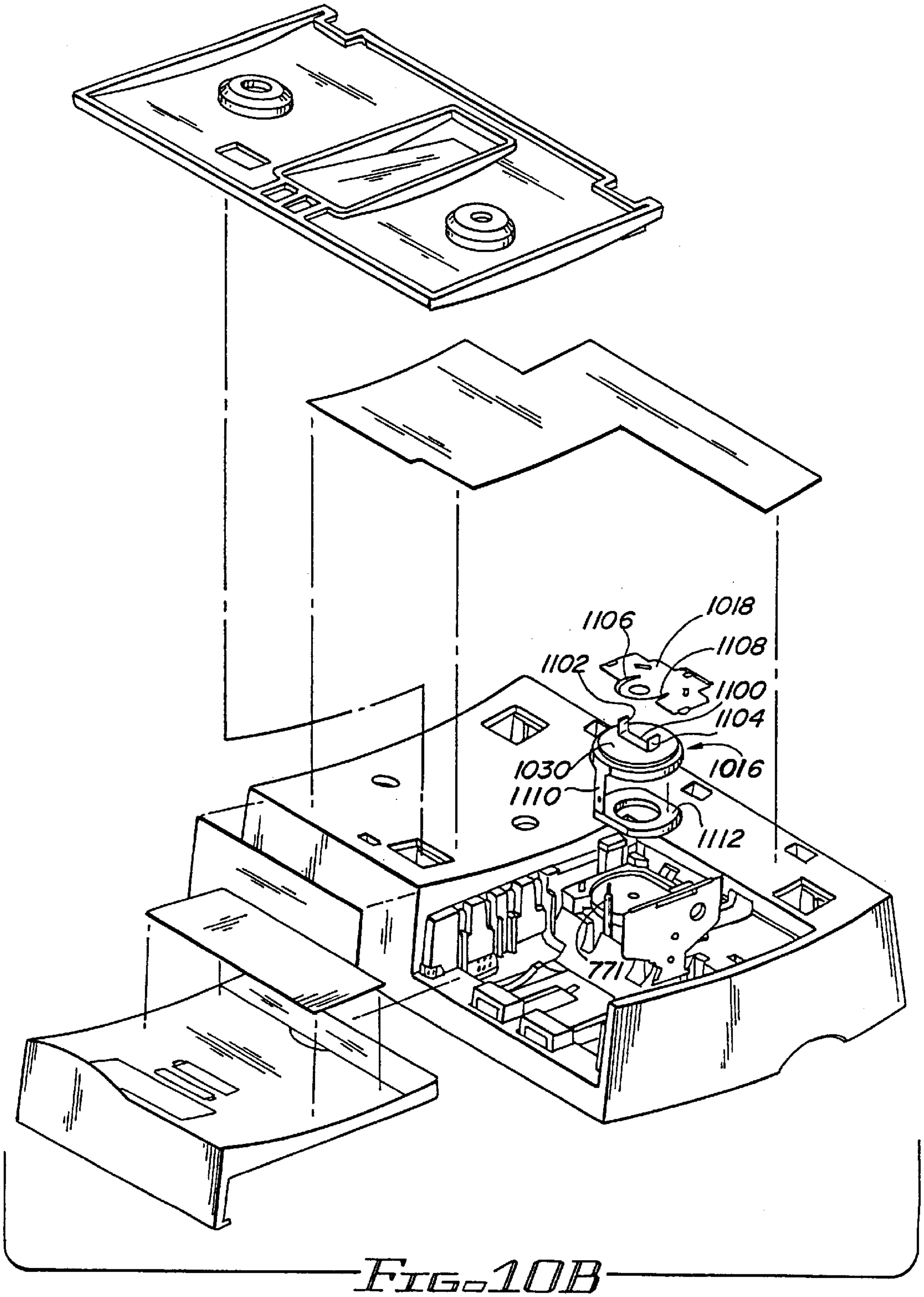
FIG. 10B is an exploded perspective view of the mounting side of the base of the unit of FIG. 6, alternatively illustrating a non-replaceable CO sensor unit.

Referring to FIGS. 7B and 10B, an alternative embodiment is shown which differs from that shown in FIGS. 7A and 10A only in that a permanently mounted (rather than replaceable) sensor unit 1016 is employed. Experience has shown that the type of sensor unit 1016 used in the presently preferred configuration is sufficiently reliable in long term use that providing for user or field replacement is not necessary for many applications, particularly for home use. Thus, a bracket 1100 is affixed, as by spot welding, to the anode 1030 and in electrical contact therewith. The bracket 1100 has upturned ends 1102, 1104, configured such that, when assembled, the respectively extend into corresponding slots 1106, 1108 in the top contact 1018. Once the sensor 1016 has been emplaced during fabrication, the upturned ends 1102, 1104, extending through the angled slots 1106, 1108, are soldered to the upper contact 1018 to effect the permanent installation. The wire 771 (see also FIG. 7B) is soldered to a tab 1110 which is fixed to the cathode 1028 of the sensor 1016. Gasket 1112 may have a slightly different configuration than gasket 1014 shown in FIG. 10A in order to clear tab 1110.

Following proper installation as described above, detector 600 will monitor the environment for CO in the following manner. Gas from the ambient environment enters the interior of detector 600. Capillary 772 provides a steady rate of flow of gas into chamber 1208. If the gas entering chamber 1208 contains CO, sensor 1016 converts the CO to $CO_2$ as previously described. If a sufficient amount of CO is sensed and, correspondingly, $CO_2$ is formed, sensor 1016 will cause circuit assembly 616 to trigger an alarm that signals the presence of a high level of CO.

Detector with Line-Operated Power Supply

Figure 17:
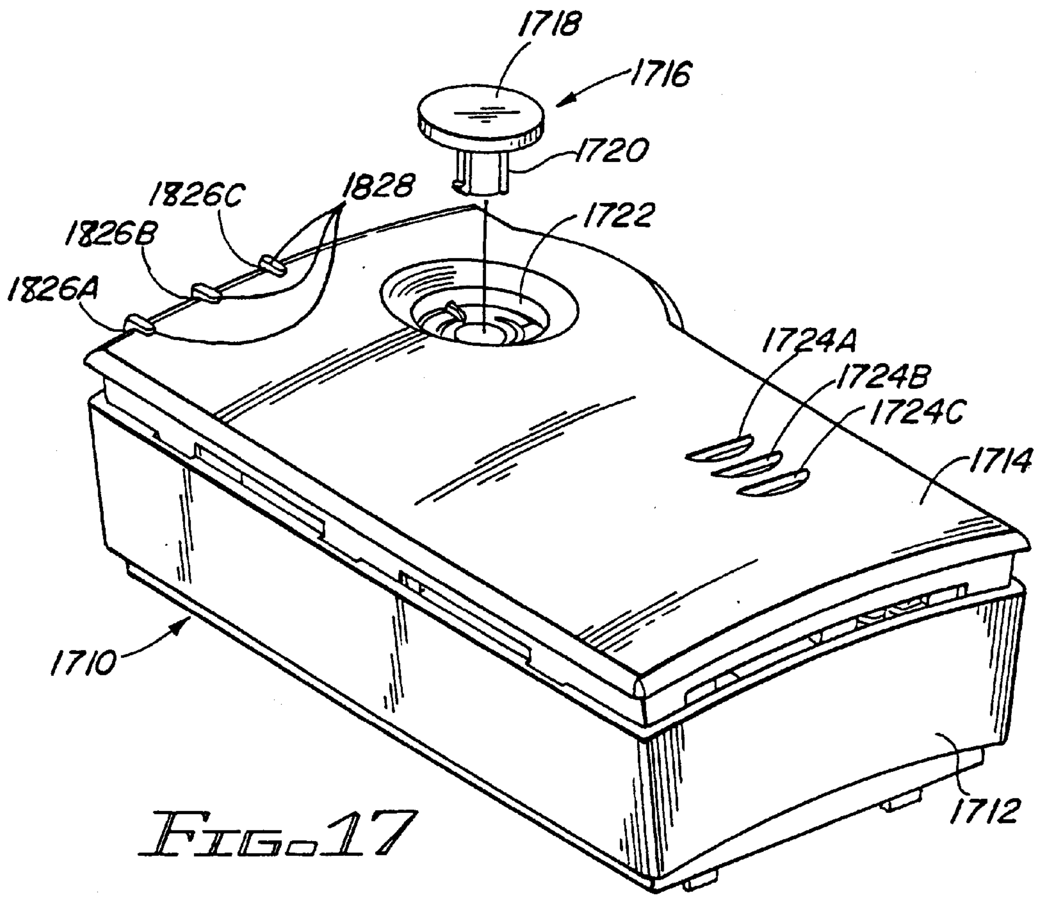
FIG. 17 is a partially exploded view of an AC line current operated CO detector embodiment in accordance with various aspects of the present invention.

Referring now to FIG. 17, there is shown an AC line-operated CO detector 1710 having a base 1712, a cover 1714 connected to the base and a button 1716, illustrated in a removed position. Button 1716 has a head 1718 and a reduced diameter portion 1720. Head 1718 is sufficiently large to allow the activation of button 1716 by a broom stick or the like. Cover 1714 has a round recess 1722 for receiving button 1716; apertures 1724A, 1724B and 1724C for facilitating the broadcasting of an alarm sound; and vertical slots 1826A, 1826B and 1826C for receiving a lightpipe unit 1828.

Figure 18:
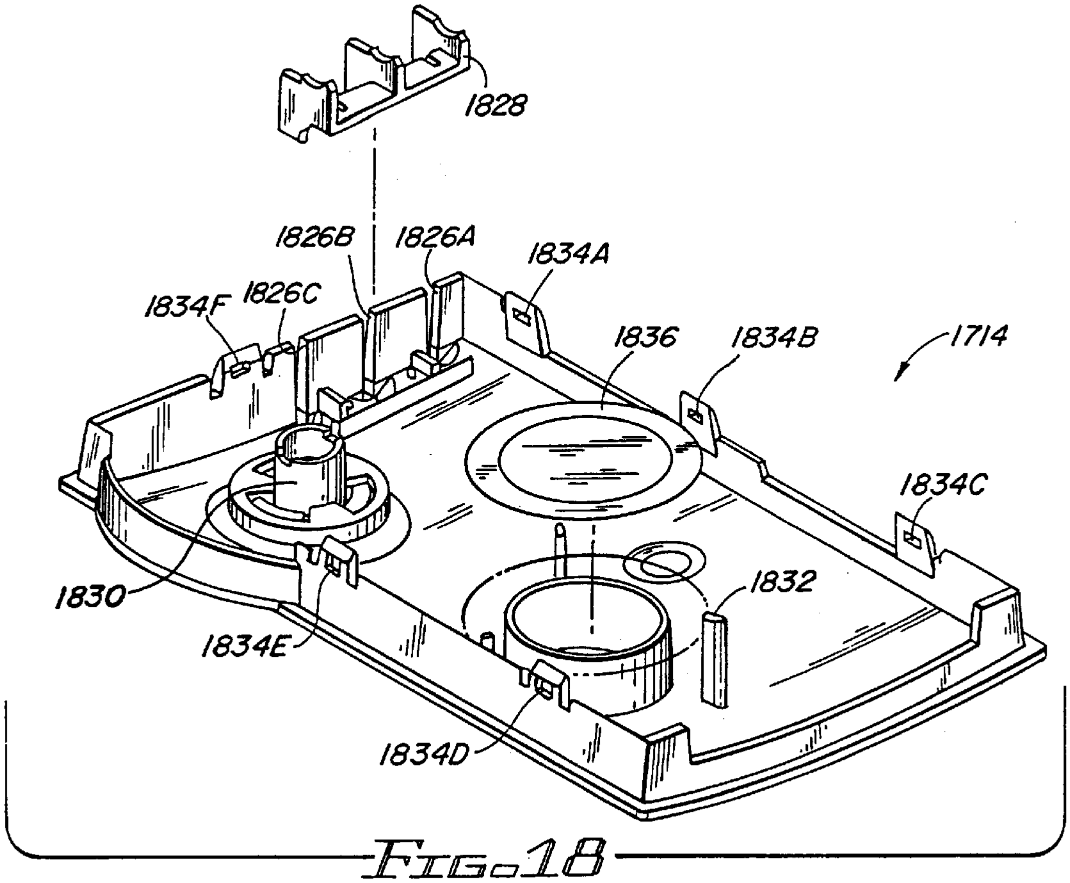
FIG. 18 is a perspective view of the inside of the cover of the embodiment of FIG. 17.

Referring now to FIG. 18, there is shown the back or interior side of cover 1714 having a cylindrical extension 1830; a rim 1832; apertures 1834A, 1834B, 1834C, 1834D, 1834E and 1834F for engaging snapping hooks (not shown in FIG. 18) when cover 1714 is attached to base 1712; and slots 1826A, 1826B and 1826C. Cylindrical extension 1830 is appropriately sized to receive reduced diameter portion 1720 so that button 1716 can activate a circuit board assembly (not shown in FIG. 18) when detector 1710 (FIG. 17) is in service.

The bottom of rim 1832 includes apertures 1724A, 1724B and 1724C (FIG. 17). A horn 1836, shown prior to assembly with cover 1714, is suitably dimensioned to securely rest on the mouth of rim 1832 and to contact a circuit board assembly (not shown in FIG. 18) so that it can be activated therefrom to broadcast an alarm. Lightpipe unit 1828, also shown prior to assembly, is constructed of crystal clear polystyrene material and is configured for insertion into slots 1826A, 1826B and 1826C.

Figure 19:
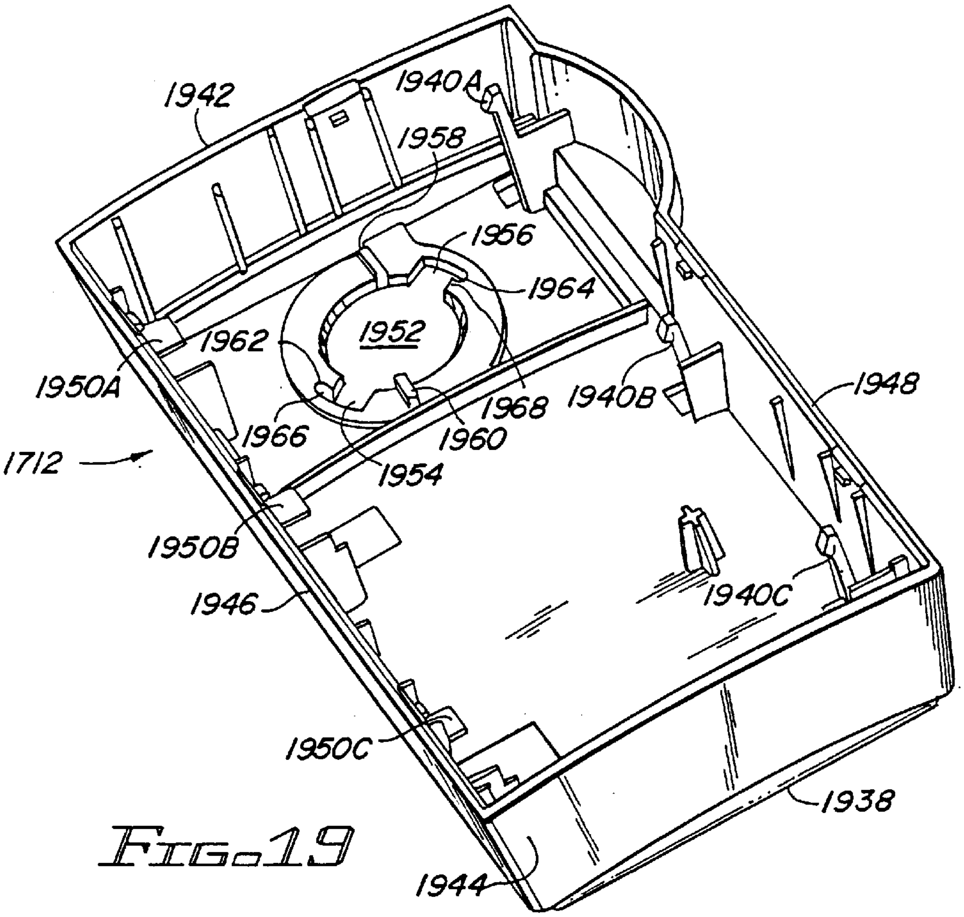
FIG. 19 is a perspective view of the interior of the base of the embodiment of FIG. 17.

Referring now to FIG. 19, base 1712 is made of plastic material and has a generally rectangular bottom 1938; hooks 1940A, 1940B and 1940C extending from bottom 1938; end walls 1942 and 1944; side walls 1946 and 1948 and extensions 1950A, 1950B and 1950C projecting inwardly from side wall 1946. Base 1712 has a circular opening 1952 with diametrically opposite radial slots 1954 and 1956. Diametrically opposite stop elements 1958 and 1960 and diametrically opposite pegs 1962 and 1964 extend from the inner surface of bottom 1938 adjacent circular opening 1952. Peg 1962 has a tapered side 1966 facing slot 1954, and peg 1964 has a tapered side 1968 facing slot 1956.

Figure 20:
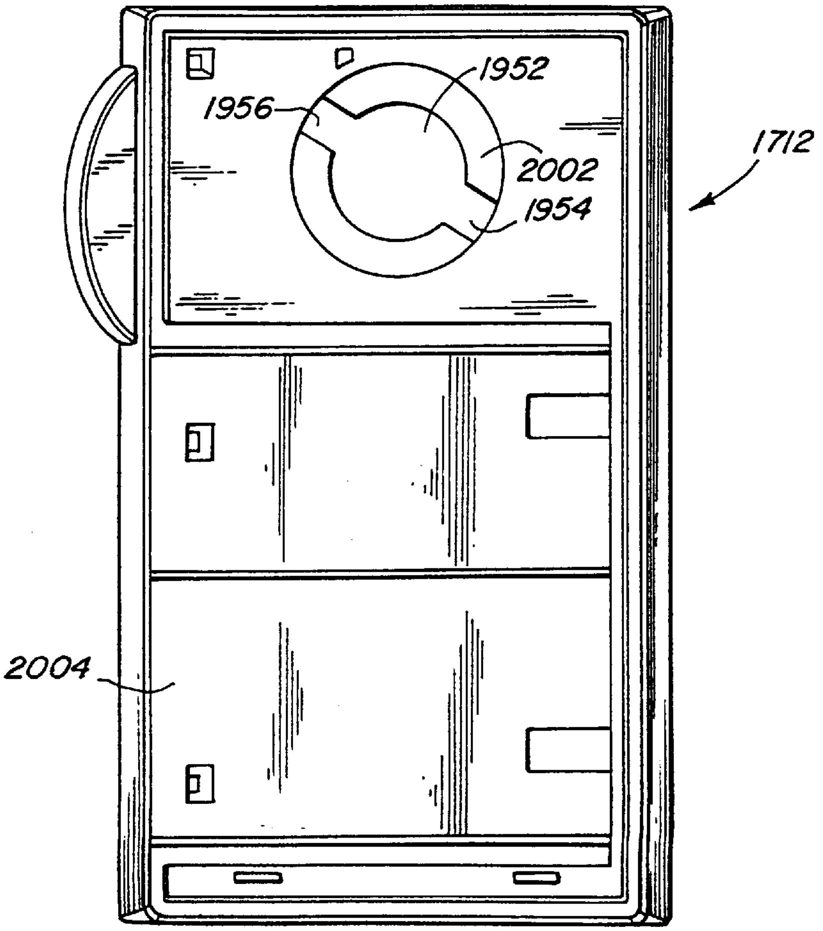
FIG. 20 is a bottom view of the base of the embodiment of FIG. 17.
Figure 23:
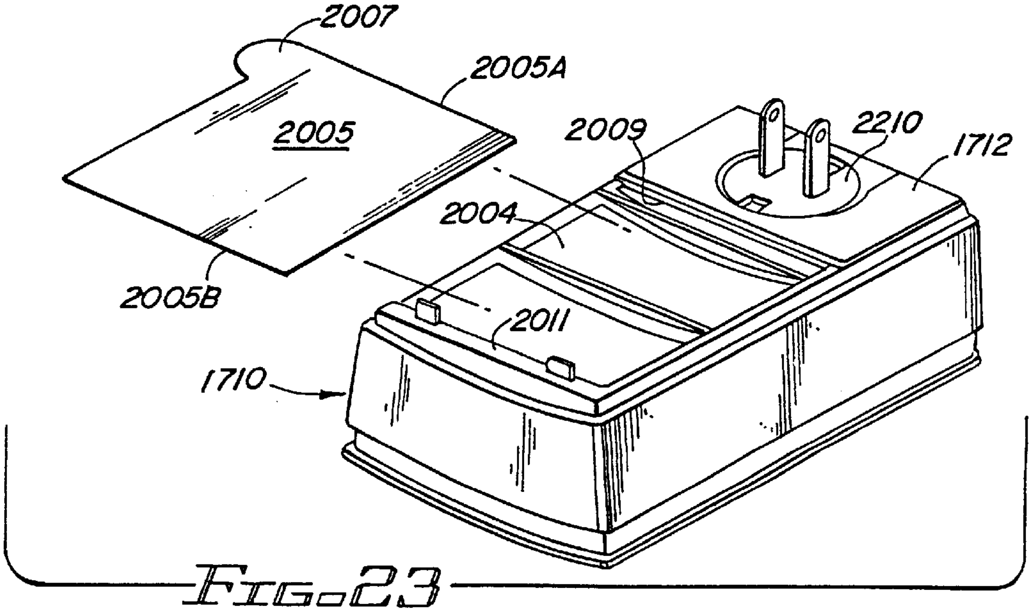
FIG. 23 is a bottom perspective view of the base of the embodiment of FIG. 17 shown with the plug of FIG. 22 attached thereon.

Referring now to FIGS. 20 and 23, there is shown a bottom view of base 1712 with opening 1952, radial slots 1954 and 1956 and a segmented circular recess 2002. The radial slots 1954 and 1956 extend outwardly beyond the maximum dimension (diameter in the example) of the opening 1952.

Rear facing base 1712 includes a label area 2004 for slidingly attaching a removable warning and alarm card 2005 carrying printed instructions and protocol information. In order to insure long term retention of the instruction and protocol information, alarm card 2005 should be durable and resilient. It may, for example, be fabricated from a relatively stiff plastic sheet or a relatively stiff paper sheet, preferably coated with a clear plastic material to preserve the printed information.

In normal use, the card 2005 is normally slidingly engaged to the base 1712 by feeding first and second generally parallel card side edges 2005A, 2005B respectively into slot 2009 and a corresponding slot (out of view in FIG. 23) behind bottom end region 2011 of base 1712, the slots being generally parallel, mutually facing and suitably spaced to retain the card. Thus, when the detector is attached to a supporting surface by, for example, plugging it into a socket, the instruction and protocol is safely stored for long term reference. If it becomes necessary to refer to the instructions and protocol information, the detector may be unplugged or otherwise detached from the supporting surface and the card 2005 slidingly removed using tab 2007 to facilitate pulling the card from the base. The card 2005 may be replaced after the purpose for its access has been achieved such that its long term preservation with the detector is maintained.

Figure 21:
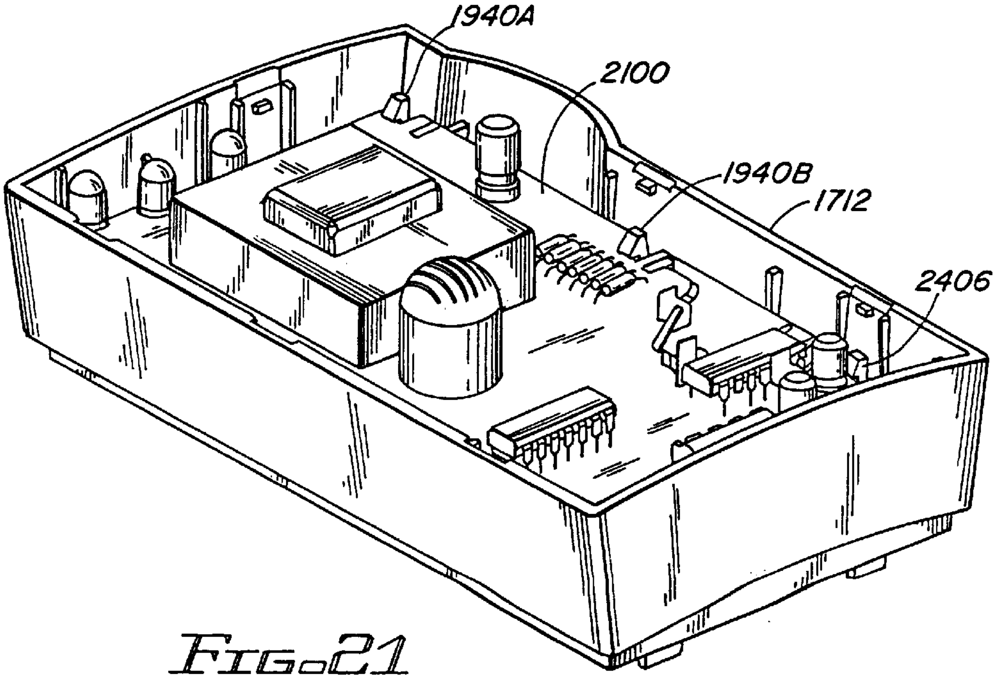
FIG. 21 is a perspective view of the interior of the base of the embodiment of FIG. 17 shown with a circuit board installed.

As shown in FIGS. 19 and 21, a circuit board assembly 2100 is inserted into base 1712 and is securely retained therein by hooks 1940A, 1940B and 1940C and extensions 1950A, 1950B and 1950C. Assembly 2100 includes appropriate detector and alarm apparatus to detect the presence of a high amount of CO and to trigger an alarm to alert people of the consequent danger.

Figure 22:
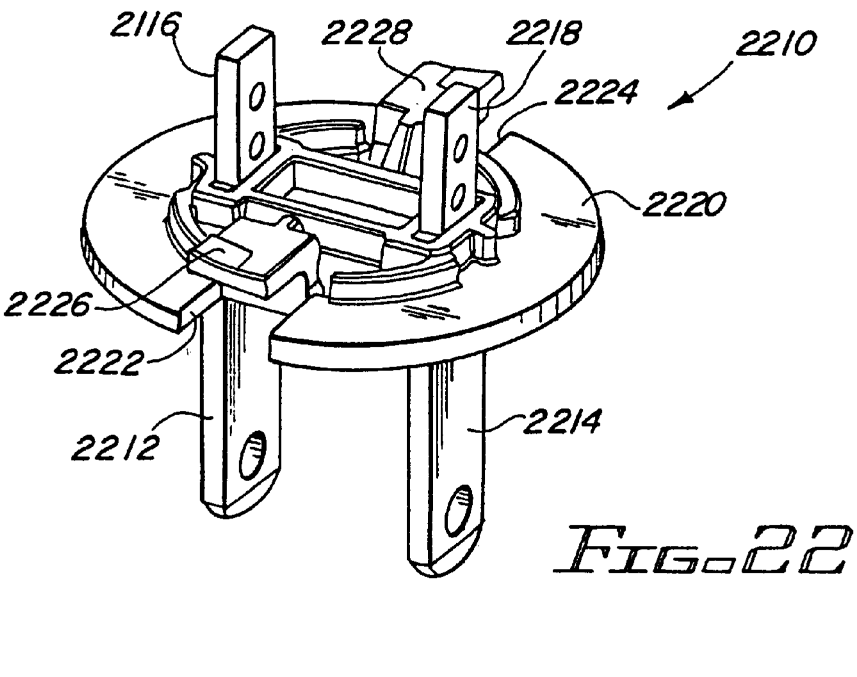
FIG. 22 is a perspective view of a plug for rotatably mounting the embodiment of FIG. 17 to an electrical socket.

One of the novel features of the present invention is the use of a rotatable plug to connect detector 1710 to an electrical socket. Referring to FIG. 22, there is a shown a plug 2210 having prongs 2212 and 2214 with corresponding terminals 2216 and 2218 for coupling an AC line to the internal power supply. Plug 2210 has a segmented flange 2220 with diametrically opposite radial slots 2222 and 2224 and diametrically opposite radial extensions 2226 and 2228 which are disposed axially offset from and immediately above slots 2222 and 2224, respectively.

Referring now to FIGS. 19, 20, 22 and 23, the plug 2210 is coupled to the base 1712 by aligning radial extensions 2226 and 2228 with slots 1954 and 1956 and inserting the plug 2210 into the opening 1952 until the segmented flange 2220 abuts the circular recess 2002.

Then, the plug 2210 is rotated to cause the radial extensions 2226 and 2228 to ride up the tapered sides 1966 and 1968 of the slots 1954 and 1956 until the radial extensions clear the pegs 1962 and 1964. The plug is then permanently captured by the base 1712. However, the plug and base are mutually rotatable between 90° spaced positions, limited by the interaction of the radial extensions 2226 and 2228 bearing against the stops 1958 and 1960 at one extreme and against the pegs 1962 and 1964 at the other extreme. Consequently, the dangerous condition warning device can be oriented, with respect to a wall socket, vertically, horizontally or at any angle between.

Referring again to FIG. 5, processor 502, as previously noted, effects a predetermined sequence of steps to appropriately test various of the system components, such as sensor 150 and power supply 20, actuate and sample the output of sensor 150 and effect generation of the appropriate audible and visual indications of ambient conditions and system operation. In this connection, processor 502 proceeds from instruction to instruction stored in ROM in a controlled sequence at a predetermined clock frequency, e.g., 4 MHz. An initialization sequence is performed, then a repetitive main loop is entered to service a number of interrupts and call various subroutines as may be appropriate. While the software directing the processor may take diverse forms, exemplary subroutines for a CO sensor employing a replaceable sensor are set forth in the detailed flow charts of FIGS. 24–39, inclusive, the functions for which are given in the following Tables 3:

TABLE 3

| DESIGNATION | SUBROUTINE | FUNCTION |
|---|---|---|
| 2400 | PowerUp | Initialization |
| 2500 | Service Interrupts | Timekeeping |
| 2600 | Main | Supervise branches to subroutines |
| 2700 | Audiovisuals 10MS | Update status of audio visual indicators; read and average the analog inputs |
| 2800 | Audiovisuals 100MS | Update status of audio visual indicators |
| 2900 | Audiovisuals 250MS | Update status of audio visual indicators |
| 3000 | Audiovisuals 500MS | Update status of audio visual indicators |
| 3100 | Audiovisuals 1S | Update status of audio visual indicators |
| 3200 | Audiovisuals 30S | Update status of audio visual indicators |
| 3300 | Audiovisuals 45S | Update status of audio visual indicators |
| 3400 | PPMIndex&Exposure Update | Sample CO sensor and Temp sensor outputs and develop exposures |
| 3500 | Battery Status Update | Check battery status; institute action if necessary |
| 3600 | TestResetRelease | Respond to actuation of button |
| 3700 | SensorSupervision20S | Read CO sensor for short term test |
| 3800 | SensorSupervision45M | Limit use of 3700 to as necessary |
| 3900 | SensorTest | Definitive test for CO sensor |

In addition, the processor employs numerous variables, flags and registers such as those set forth in the following Table 4:

TABLE 4

| NAME | CONTENT |
|---|---|
| Accumulator | interini process result (hardware register) |
| Status | (hardware register) |
| Timer() | count in hardware register indicative of elapsed basic time period |
| 10MS flag | indicative of basic time interval, e.g., 10 ms |
| 100MS flag | indicative of second time interval, e.g., 100 ms |
| 250MS flag | indicative of third time interval, e.g., 250 ms |
| 500MS flag | indicative of fourth time interval, e.g., 500 ms |
| 1S flag | indicative of fifth time interval, e.g., 1 second |
| 30S flag | indicative of sixth time interval, e.g., 30 seconds |
| 45S flag | indicative of seventh time interval, e.g., 45 seconds |
| Update_Status flag | indicative of change in sensed conditions |
| Horn_Test flag | indicative of an ongoing test of horn |
| Stabilizer_Count | tracks settling time for a–d converters |

TABLE 4-continued

| NAME | CONTENT |
|---|---|
| Stabilizer flag | indicative of requirement to let a–d converters settle |
| YellowLED_State flag | indicative of presert state of Yellow LED2 drive |
| RedLED_State flag | indicative of present state of Red LED3 drive |
| Horn_State flag | indicative of present state of Horn driver |
| YellowLED_On flag | indicative of desired on condition of Yellow LED2 |
| YellowLED_Off flag | indicative of desired off condition of Yellow LED2 |
| PowerLED_State flag | indicative of present state of PowerLED |
| PowerLED_On flag | indicative of desired on condition of PowerLED |
| PowerLED_Off flag | indicative of desired off condition of PowerLED |
| Supervision_Test flag | indicative of desire to test CO sensor |
| GreenLED_State flag | indicative of present state of Green LED1 drive |
| GreenLED_On flag | indicative of desired on condition of Green LED1 |
| GreenLED_Off flag | indicative of desired off condition of Green LED1 |
| CO_A–D | average of last 10 CO sensor readings |
| Thermistor_A–D | CO sensor temperature reading |
| Battery_A–D | battery voltage reading |
| RedLed_On flag | indicative of desired on condition of Red LED3 |
| RedLed_Off flag | indicative of desired off condition of Red LED3 |
| Hush flag | indicative of presert state of hush feature |
| Alarm flag | indicative of current alarm condition |
| Horn10MS_On flag | indicative of desired oncondition of horn drive |
| Horn10MS_Off flag | indicative of desired off condition of horn drive |
| Hush_Ack flag | acknowledges that hush action has been instituted |
| 250MS_Space_On flag | timer for audio-visuals |
| 250MS_Space_Off flag | timer for audio-visuals |
| 250MS_Horn_On flag | timer for audio-visuals |
| 250MS_Horn_Off flag | timer for audio-visuals |
| Warning flag | indicative of current warning condition |
| Battery_Conidition flag | indicative of need for human intervention |
| Replace_Sensor flag | indicative of need for human intervention |
| Hush_Counter | times out hush period |
| TM_Counter | temperature count |
| Index/Max Table | look-up table |
| TM_Index | temperature entries in look-up table |
| CO_Max | CO value entries in look-up table |
| Exposure_Counter | tracks time of exposure at a suspect CO level |
| Supervision_20S flag | indicative of requirement to run Supervision20S subroutine |
| Replace_Now flag | indicative of necessity to issue replace CO sensor immediately message to user |
| Replace_Later flag | indicative of necessity to issue replace CO sensor soon message to user |
| Save_Power flag | indicative of permission to enter power saving mode |

Figure 24:
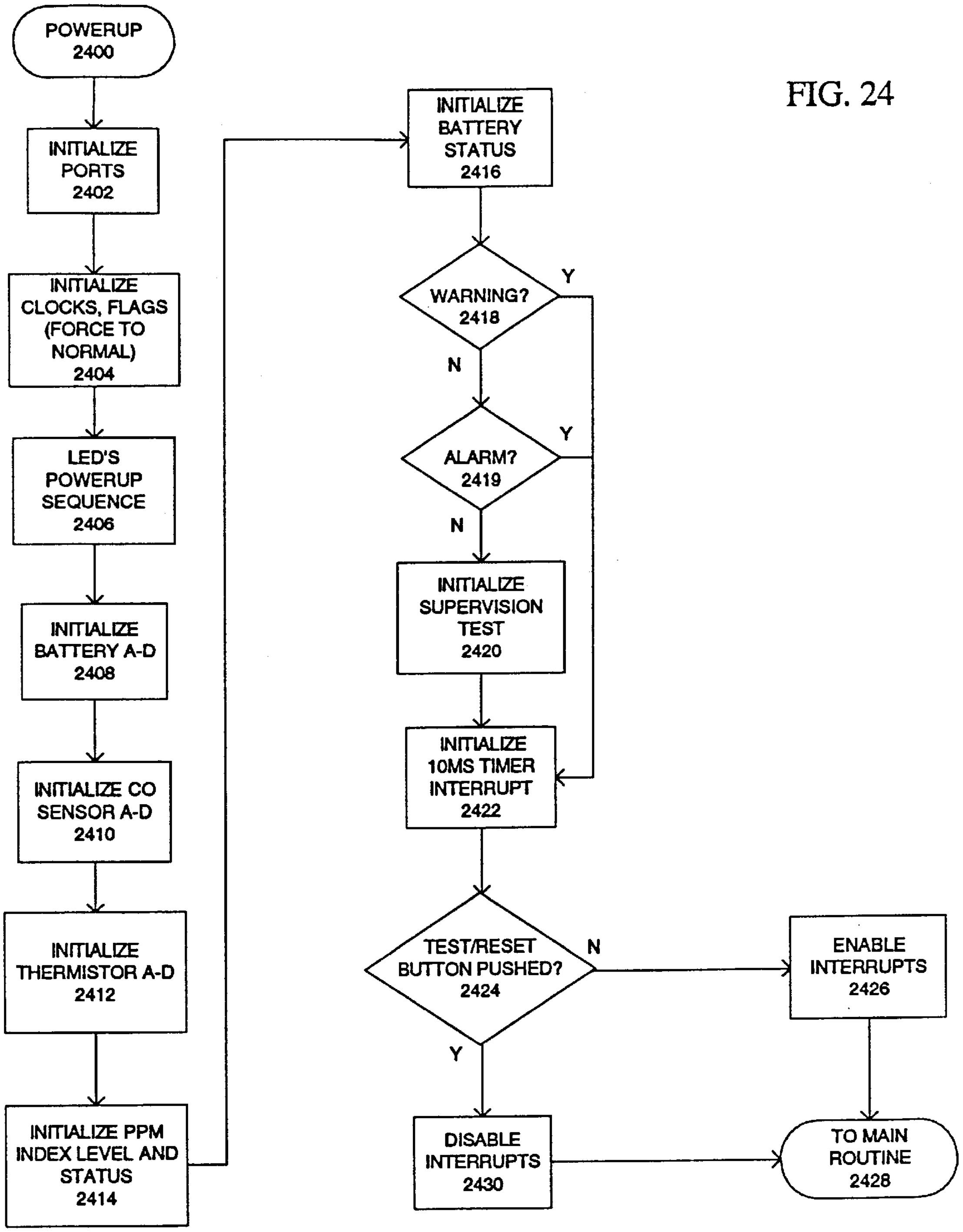
FIG. 24 is a flowchart of a powerup routine employed in the exemplary embodiment of FIG. 6.
Figure 25:
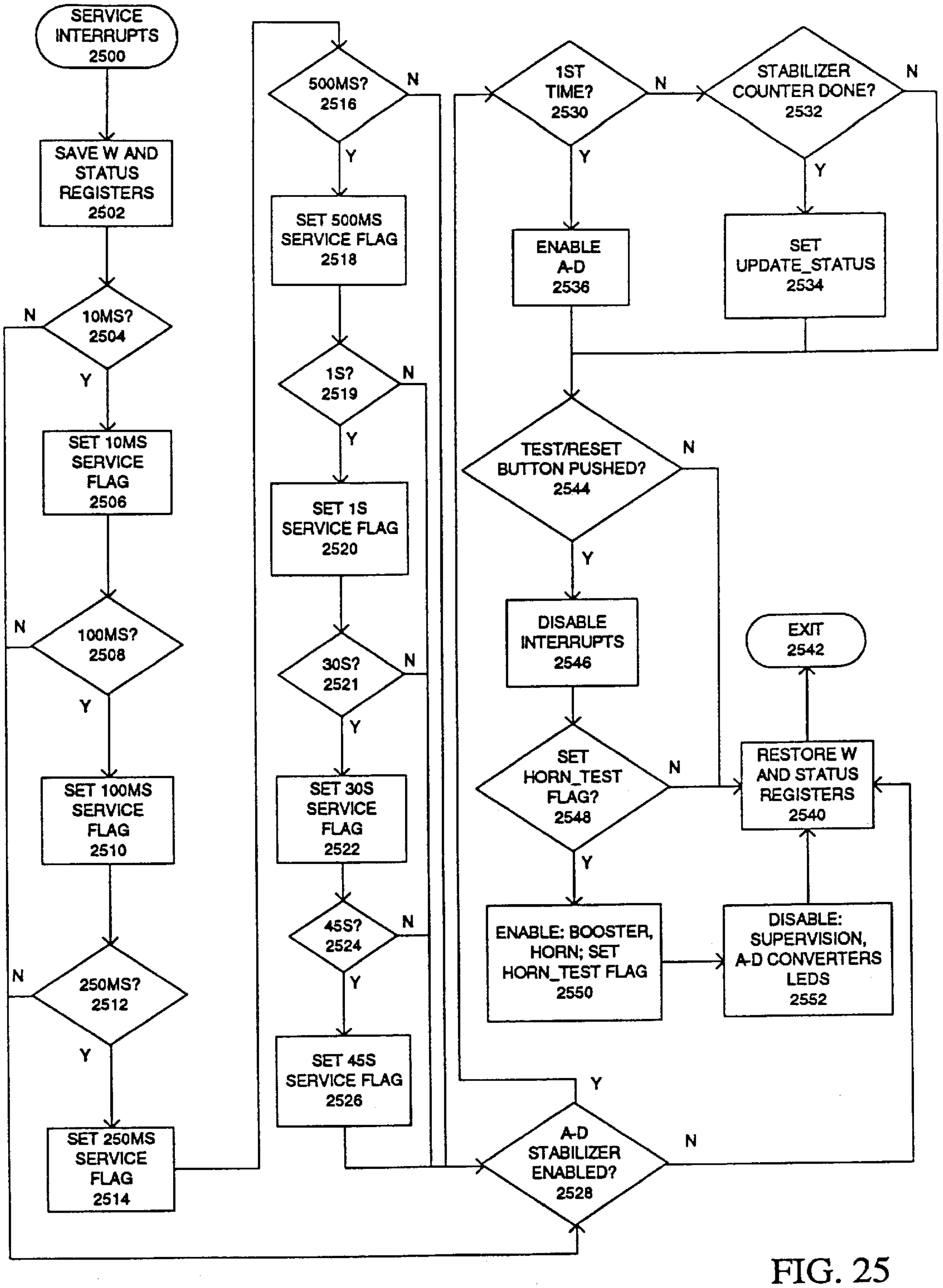
FIG. 25 is a flowchart of a service interrupt routine of the embodiment of FIG. 6.

Referring now to FIG. 24, when processor 502 is initially powered up (and thereafter in response to actuation of test/reset switch 134), an initialization sequence 2400 is carried out. The I/O ports are initialized (step 2402), the clocks and flags are initialized (step 2404), an LED power up sequence is carried out (step 2406), the analog-to-digital converters are initialized steps 2408, 2410 and 2412) and various indexes and status registers are initialized (steps 2414 and 2416). Tests are then performed (steps 2418 and 2419) to determine whether or not an alarm or warning condition presently exists (which is possible if the switch 134 is actuated after the device has been in use). Assuming no such current alarm or warning condition, a sensor supervision test is initialized (step 2420). If a warning or alarm condition exists (or, if not, after the supervision test is performed), a ten millisecond timer interrupt is initialized (step 2422). A test is then made to determine if the test/reset button is actuated (step 2424). If the test/reset button is not actuated at this instant, the various interrupts are enabled (step 2426) and the process proceeds to the main program sequence 2600 (step 2428). If the test/reset switch is actuated, the interrupts are disabled (step 2430) prior to proceeding to the main program sequence.

Timekeeping is achieved by employing periodically generated interrupts. Referring to subroutine 2500 shown in FIG. 25, when a service interrupt (Timer 0) is received, the contents of accumulator W and the status registers of processor 502 are saved (step 2502). The contents of Timer 0 are tested in sequence against indicia of the various intervals of interest; in the example, the intervals are 10 milliseconds, 100 milliseconds, 250 milliseconds, 500 milliseconds, 1 second, 30 seconds and 45 seconds and the corresponding flags are set as appropriate to the instant (steps 2504–2526).

After the timer flags have been set as appropriate, a determination is made as to whether any ongoing a–d conversion process has stabilized. Since this settling time period is determined by a stabilizer counter, if this is not the first pass through the loop (step 2530), the stabilizer count is checked (step 2532). If the stabilizer count has completed, the a-d converters may be read, and the Update_Status flag is therefore set. If this is the first time through, the a–d conversions are started (step 2536).

Next, a determination is made as to whether the test/reset button is actuated (step 2540), and an exit is made back to the main program sequence 2600 (step 2542). If the button is currently actuated, the interrupts are disabled (step 2546), and a determination is made (from other conditions already established) as to whether to set the Horn_Test flag. If not, exit is made through step 2540 as previously described. If the Horn_Test flag is to be set, the booster is enabled (to bring up the supply voltage as necessary) and the flag is set (step 2550). Then, to carry out the test process, the supervision, the a-d converters and LEDs are disabled (step 2552) and exit is made through step 2540 as previously described.

Figure 26:
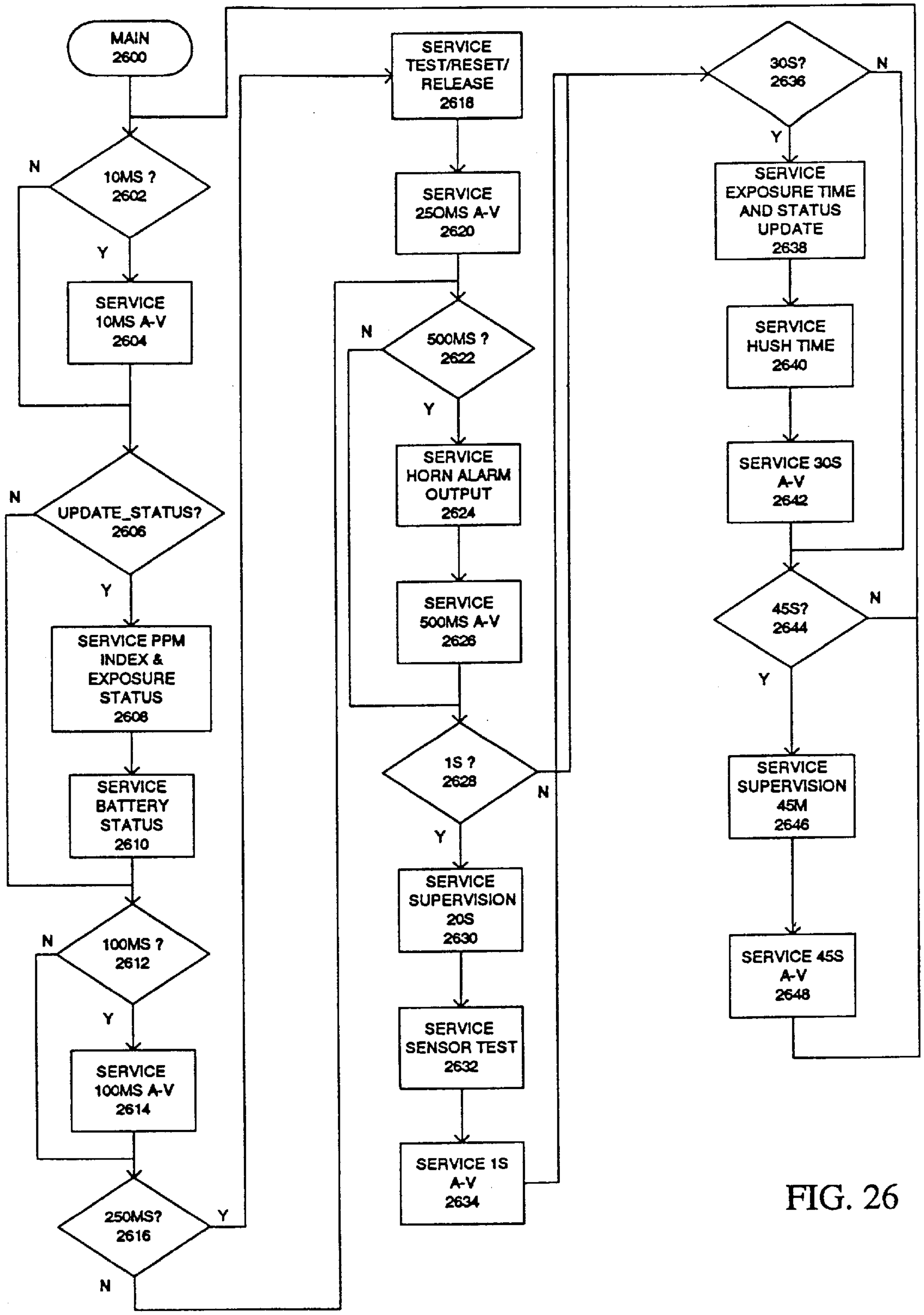
FIG. 26 is a flowchart of a main routine of the embodiment of FIG. 6.

Referring now to FIG. 26, the main program loop 2600 tracks time and controls the process flow to the various subroutines to control the indicators and sensors accordingly. As previously described, respective flags are periodically set to indicate the passage of predetermined time periods, e.g., 10 milliseconds, 100 milliseconds, 250 milliseconds, 500 milliseconds, 1 second, 30 seconds and 45 seconds, from an initiating event. Specified tasks are performed at each of the respective time intervals. (In a few instances, as will become more clear below, time is separately kept in some subroutines.) When the main loop 2600 is entered, the 10 MS flag is tested to determine if 10 milliseconds have elapsed (step 2602). If 10 milliseconds have elapsed, process flow is momentarily diverted to an audio visuals 10 MS subroutine 2700 to update the status of the various indicator devices (as previously noted (see Table 2), various of the visual indicators (LED's) are turned on for periods equal to the basic interval, 10 milliseconds in the example). Audio visual 10 MS subroutine 2700 will be described in more detail in conjunction with FIG. 27.

Figure 34:
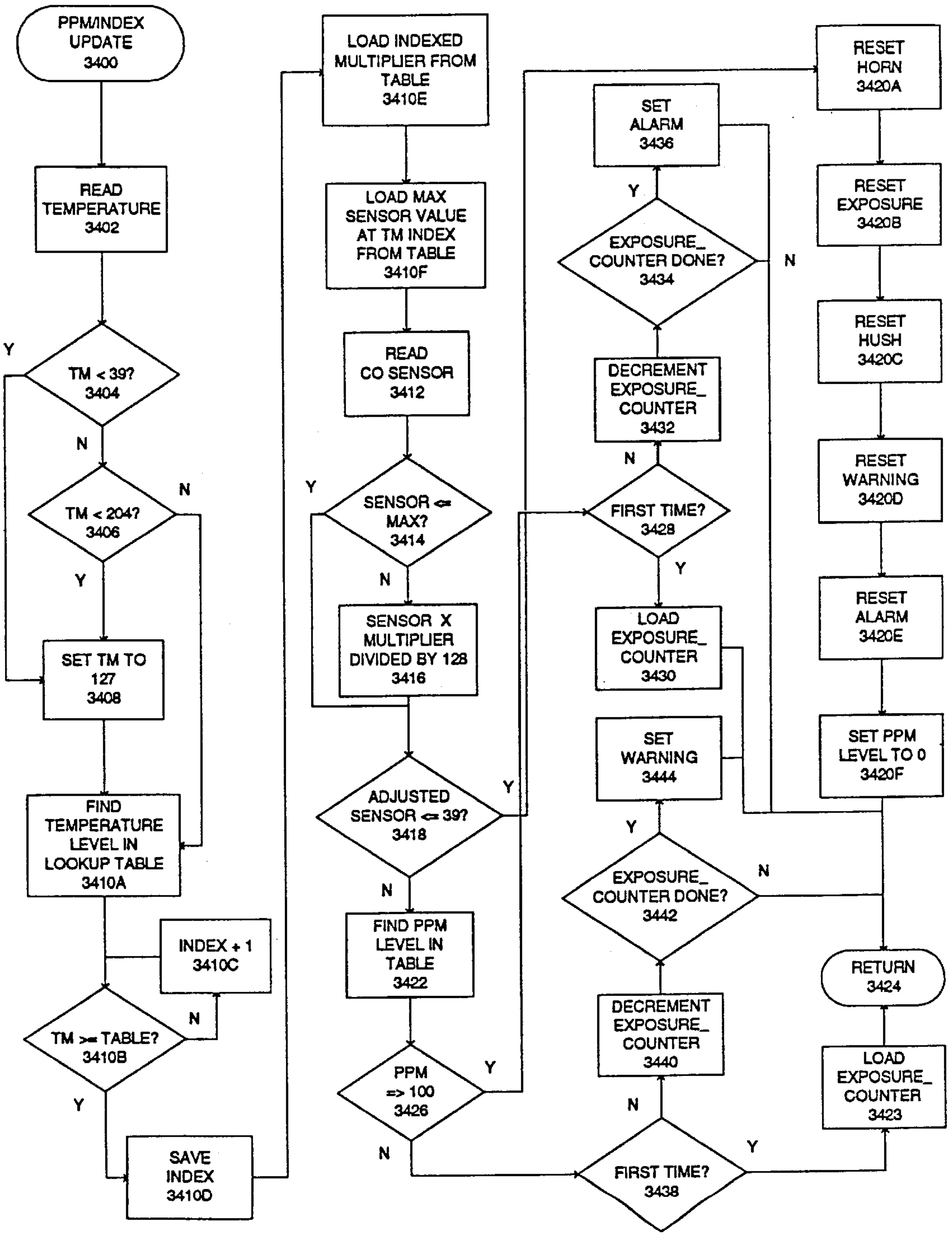
FIG. 34 is a flowchart of a PPM index update routine of the embodiment of FIG. 6.

If the 10 MS flag is not set, or after the audio visuals 10 MS subroutine has been performed, the Update_Status flag is tested to determine if there has been a change in any of the sensed conditions. If a change in status is indicated (step 2606), various condition update subroutines are executed (step 2608) in subroutine 3400 (FIG. 34). In addition, a battery status update subroutine 3500 (FIG. 35) is carried out (step 2612). After the condition update has been effected as appropriate, the 100 MS flag is tested.

If the 100 MS flag is set, process flow is directed to the audio visuals 100 MS subroutine 2800 (FIG. 28) (step 2614). The 250 MS flag is then tested (step 2616). If 250 MS have elapsed, test/reset/release subroutine 3600 (FIG. 36) is executed (step 2618), and then the audio visual 250 MS subroutine 2900 (FIG. 29) is executed (step 2620). The 500 MS flag 2308 is then tested (step 2622). If 500 MS have elapsed, the horn alarm output is serviced (step 2624), and the audio visual 500 MS routine 3000 is then performed (FIG. 30) (step 2626).

The 1 S flag is then checked (step 2628) to determine if one second has elapsed. If so, various sensor supervision functions are performed, and the audio visual status is updated. More specifically, sensor supervision 20 S subroutine 3700 and sensor test subroutine 3900 are each checked to determine if action is necessary and to carry out such actions as are indicated (steps 2630 and 2632). The audio visuals Is subroutine 3100 is then executed (step 2634). The 30 S flag 2312 is then tested to see if a 30 second interval has elapsed. If so, subroutine 3400 is serviced (step 2638). The hush time update routine, and audio visual 30 s routine 3200 are next executed (steps 2640, 2642). The 45 S flag is then tested to determine if 45 seconds have elapsed (step 2644). If so, the sensor supervision subroutine 3800 is checked (step 2626) and the audio visual 45 S routine 3300 is then executed (step 2648). To close the main loop, a return is made back to the beginning; i.e., back to step 2602 Otherwise, the return is directly made from step 2644.

The various audio visual routines (2700, 2800, 2900, 3000, 3100, 3200, and 3300) cooperate to provide the various condition indications shown in Table 2. As previously noted, various signaling actions occur upon a 10 millisecond basis: a normal standby operation is signified by activating green LED1 for a single 10 millisecond duration pulse at one minute intervals. Similarly, a device fault is indicated by activating green LED1 in bursts of five pulses, each of 10 millisecond duration, at one minute intervals in conjunction with the actuation of horn 142 for a single 10 millisecond duration pulse at about the time of the first LED pulse. A CO warning condition is indicated by, inter alia, actuating yellow LED2 in a repeating sequence of 10 millisecond pulses at one second intervals for the duration of the condition; and a CO alarm condition is indicated by, inter alia, activating red LED3 in a repeating sequence of 10 millisecond pulses at 100 millisecond intervals.

Figure 27:
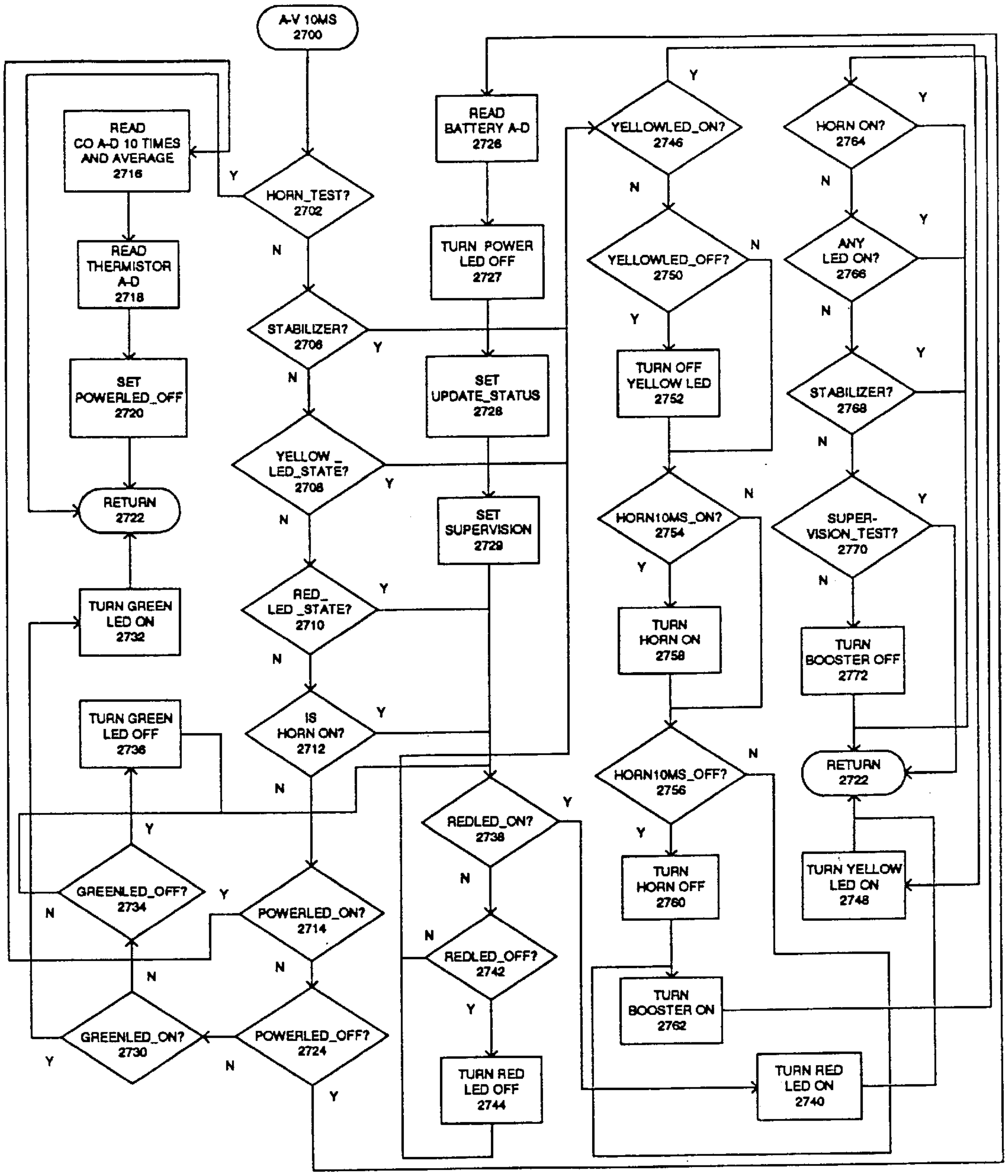
FIG. 27 is a flowchart of an audio visual 10 ms subroutine of the embodiment of FIG. 6.
Figure 28:
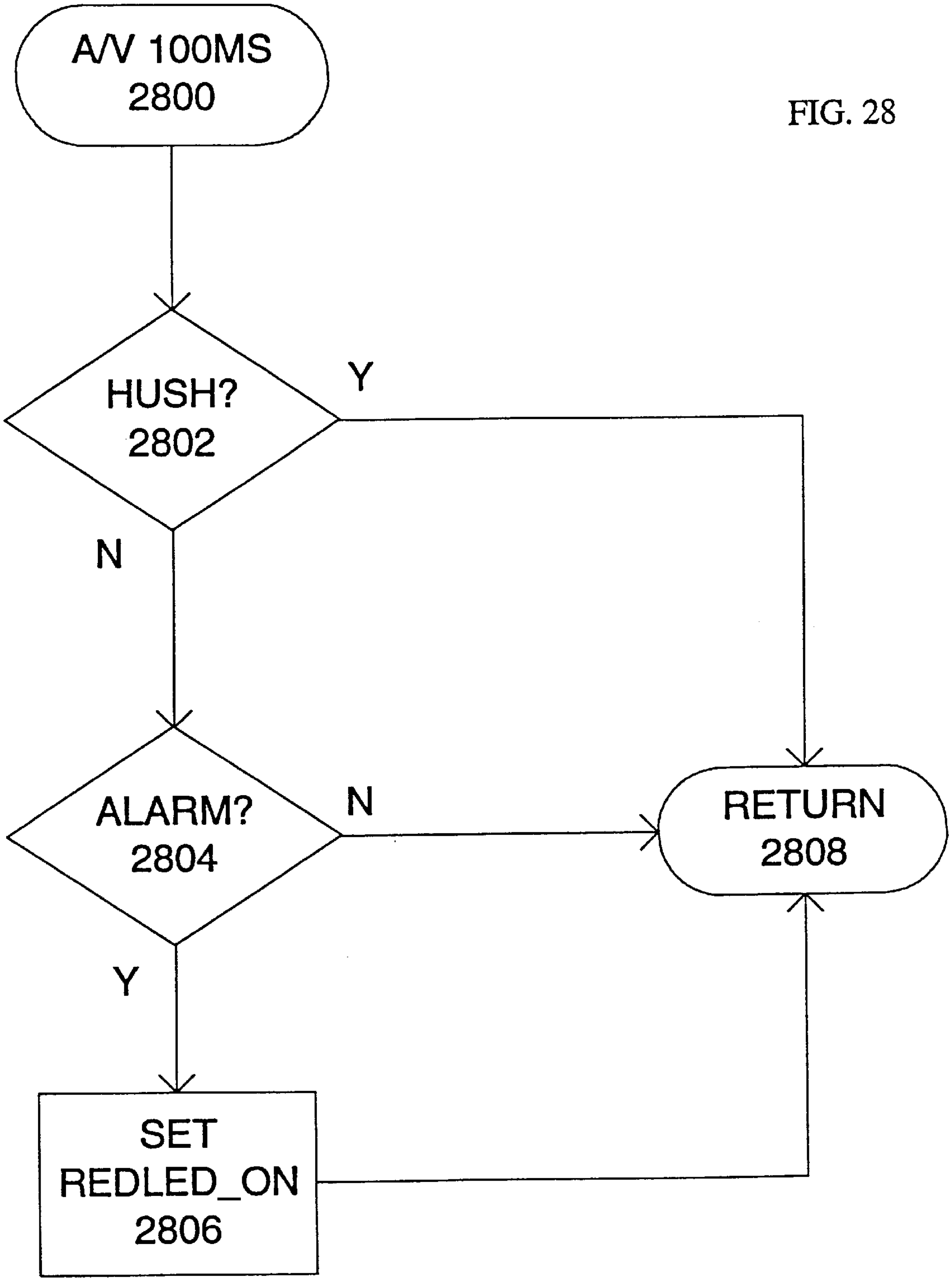
FIG. 28 is a flowchart of an audio visual 100 ms subroutine of the embodiment of FIG. 6.

Referring now to FIG. 27, the audio visuals 10 MS routine 2700 is run at 10 millisecond intervals to update the status of the audio visual indicators (in the example, audio indicator horn driver 140 and visual indicators 132 (LED1, LED2 and LED3) and to read and average the various analog inputs. The several status flags are first tested to ensure that events are not already on-going (steps 2702–2712). More specifically, Horn_Test flag (step 2702), Stabilizer flag (step 2706), YellowLED_State flag (step 2708), RedLED_State flag (step 2710) and Horn_State flag (step 2712) are tested in turn. Assuming that none of the tested events are indicated, PowerLED_On flag is tested (step 2714).

Assuming that the PowerLED_On flag is set, the analog inputs are sampled. More specifically, the CO sensor reading is sampled, averaged with the preceding nine samples and the result stored (step 2716). Similarly, the signal indicative of sensor temperature from thermistor 408 is sampled (step 2718). The power LED is turned on and PowerLED_Off flag 2336 is set (Step 2720) in preparation for the next 10 millisecond cycle. If the PowerLED_On flag 2334 is not on, PowerLED_Off flag 2336 is tested (Step 2724). If the PowerLED_Off flag is set, the input signal indicative of battery level is sampled (step 2726). The power LED is then turned off, and the Update_Status flag and Supervision_Test flags (step 2728) are set.

If, on the other hand, the PowerLED_Off flag is reset, rather than sampling the battery condition, the GreenLED_On flag is tested (step 2730). If the GreenLED_On flag is set, the green LED1 is turned on (step 2732), and a return is then effected (step 2722 which, for convenience, is shown in two places in FIG. 27). If the GreenLED_On flag is not set, GreenLED_Off flag is tested (step 2734) and the green LED1 is turned off as appropriate (step 2736).

If it is determined, in steps 2710 or 2712, that red LED3 is on or that the horn is on, or if the PowerLED_Off flag is set and the Update_Status and Supervision_Test flags are set, or if PowerLED_Off flag is reset, then, after the green LED1 is turned off, the RedLED_On flag is tested (step 2738), and if set, red LED3 is turned on (step 2740) and a return is effected (step 2722). If the RedLED_On Flag is reset, the RedLED_Off Flag is tested (step 2742) to determine whether or not it is time to turn off the red LED3, and if called for, the red LED3 is turned off (step 2744).

Thereafter, or if the Stabilizer flag was determined to be set (step 2706) or if the yellow LED2 is determined to be on (step 2708), the YellowLED_On flag is tested (step 2746) and, if called for, the yellow LED2 is turned on (step 2748) and a return effected (step 2722). If the YellowLED_On flag is reset, the YellowLED_Off flag is tested (step 2750) to determine if yellow LED2 should be turned off and, if called for, the yellow LED2 is turned off (step 2752).

A similar process is performed with respect to the horn. Horn_10 MS_On flag and Horn_10 MS_Off flag are tested (steps 2754 and 2756), and the horn is turned on (step 2758) or off (step 2760) as called for. The booster condition is then implemented (step 2762), i.e., the control signal to the power supply 20 (FIG. 2) to selectively generate the full 5.0 volt supply is rendered active by rendering transistor Q2 conductive to pull the FB terminal of converter 202 to ground and, in effect, enable converter 202. Then, if the horn should be on (step 2764), or if any LED should be on (step 2766), or if the Stabilizer flag is set (step 2768) or the Supervision_Test flag is set (step 2770), a return is effected (step 2722). Otherwise, the booster is turned off (step 2772) prior to effecting the return since the added power is not required under the immediate conditions, thus limiting battery drain.

As previously noted, various other actions in connection with generation of the audio visual signals occur at intervals of 100 milliseconds. When the 100 millisecond flag is found to be set (step 2612) during the execution of the main loop 2600, audio visuals 100 MS subroutine 2800 is called. As previously noted, when an alarm condition is detected, red LED3 is activated in a repeating sequence of 10 millisecond pulses at 100 millisecond intervals. Accordingly, when it is determined that a 100 millisecond interval has elapsed, RedLED On flag is set. More specifically, referring to FIG. 28, assuming that the hush feature is not enabled as determined by a test of the Hush flag (step 2802), and further assuming that an alarm condition has been sensed as determined by a test of the Alarm flag (step 2804), RedLED_On flag is set (step 2806). If the hush feature has been enabled, or if there is no alarm condition, or after the RedLED_On flag is set, as appropriate, a return is effected (step 2808).

As previously noted, when a CO warning condition is detected, horn 142 is activated in a repeating sequence of 250 millisecond pulses at 30 second intervals for the duration of the condition. However, the horn is also activated during tests and is inhibited for a period of time if the hush feature is activated. Accordingly, when, during execution of main loop 2600, it is determined that an interval of 250 milliseconds has lapsed by testing the 250 MS flag (step 2616), audio visuals 250 MS subroutine 2900 is executed (step 2620).

Figure 29:
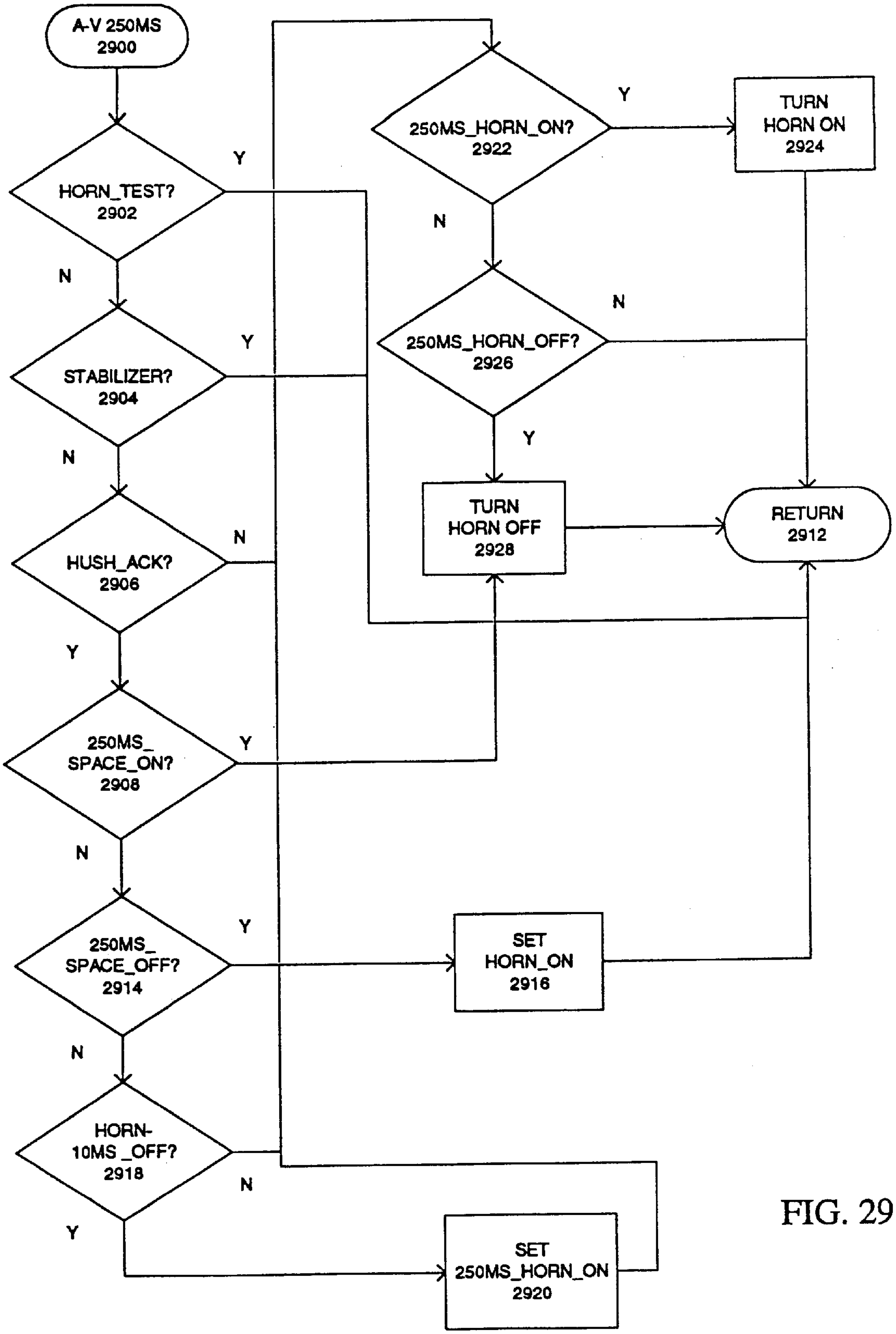
FIG. 29 is a flowchart of an audio visual 250 ms subroutine of the embodiment of FIG. 6.

Referring to FIG. 29, assuming that the horn test is not enabled as determined by testing Horn_Test flag (step 2902), that the stabilizer period is not on-going as determined by a test of Stabilizer flag (step 2904) and that hush is enabled, as determined by a test of Hush_ACK flag (step 2906), a test of the 250 MS_Space_On flag is performed to determine whether or not a 250 millisecond space is set (step 2908); if so, the horn drive is rendered inactive to turn the horn off (step 2928), and a return is effected (step 2912). If the Horn_Test or Stabilizer flags are found to be set (steps 2902, 2904), a return is likewise directly made (step 2912).

If the 250 MS_Space_On flag is not set, the 250 MS_Space_Off flag is tested (step 2914) to determine if the 250 millisecond space is done. If it is determined that the 250 millisecond space is done, the Horn10 MS_On flag is set (step 2916), and a return is effected (step 2912). Otherwise, the Horn10 MS_Off flag is tested to determine whether or not the 10 millisecond horn is done (step 2918), and, if so, the 250 MS_Horn-on flag is set (step 2920). If the Horn10 MS_Off flag is not set, or if the Hush_Ack flag was found not to be set (step 2906), the 250 MS_Horn_On flag 2368 is tested (step 2922) and, if set, the horn drive is enabled (step 2924) and a return effected (step 2912). If, however, the 250 MS_Horn_On flag is not set, the 250 MS_Horn_Off flag is tested (step 2926) and, if set, horn drive is rendered inactive (step 2928), and a return is effected (step 2912). It will be noted that this subroutine includes a feature for overruling the hush function if a CO alarm condition has instituted the characteristic 250 millisecond horn pulses.

Figure 30:
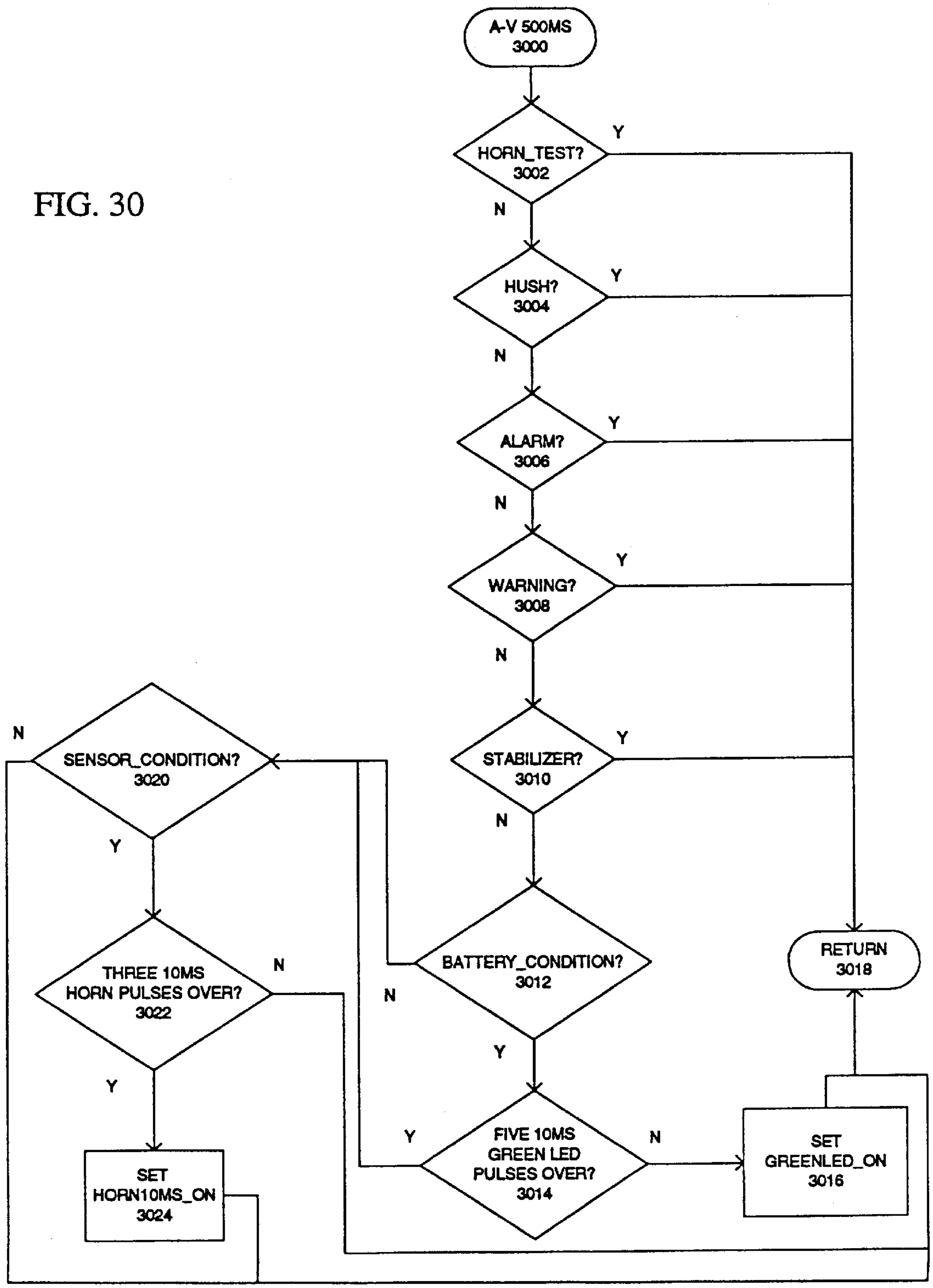
FIG. 30 is a flowchart of an audio visual 500 ms subroutine of the embodiment of FIG. 6.

Referring to FIG. 30, various other functions are carried out at intervals of 500 milliseconds when audio visual 500 MS subroutine 3000 is called as determined by the condition of the 500 MS flag (step 2622). Assuming that there is no ongoing horn test as determined by a test of the Horn_Test flag (step 3002), that the hush feature is not enabled as determined by a test of Hush flag (step 3004), that no alarm or warning conditions are current as determined by tests of the Alarm and Warning flags (steps 3006 and 3008) and that an analog-to-digital converter stabilizer period is not on-going as determined by a test of the Stabilizer flag (step 3010), a test of Battery_Condition flag is made (step 3012). If the Battery_Condition flag is set, a test is performed to determine whether or not five 10 MS green LED pulses are over (step 3014). If not, the GreenLED_On flag is set (step 3016) and a return effected (step 3018). A return is directly effected if the horn test or hush features are activated, alarm or warning conditions exist or if the stabilizer period is on-going (steps 3002–3010).

If the Battery_Condition flag is reset, or after five 10 millisecond green LED pulses have been generated, a test of the Sensor_Condition flag is made (step 3020). If the Sensor-Condition flag is not set, a return is effected (step 3018). However, if the Sensor_Condition flag is set, a test is made (step 3022) to determine whether or not three 10 millisecond horn pulses have issued. If not, a return is effected; if so, Horn10 MS_On flag is set as appropriate (step 3024) and a return effected (step 3018).

The audio visual 1 S subroutine 3100 performs those functions occurring at one second intervals as previously noted: CO warning conditions are suitably identified by, inter alia, activating yellow LED2 and repeating the sequence of 10 millisecond pulses at one second intervals for the duration of the condition. Accordingly, when a one second interval is detected, by testing of 1 S flag (step 2628), during execution of main loop 2600, audio visual is subroutine 3100 is carried out.

Figure 31:
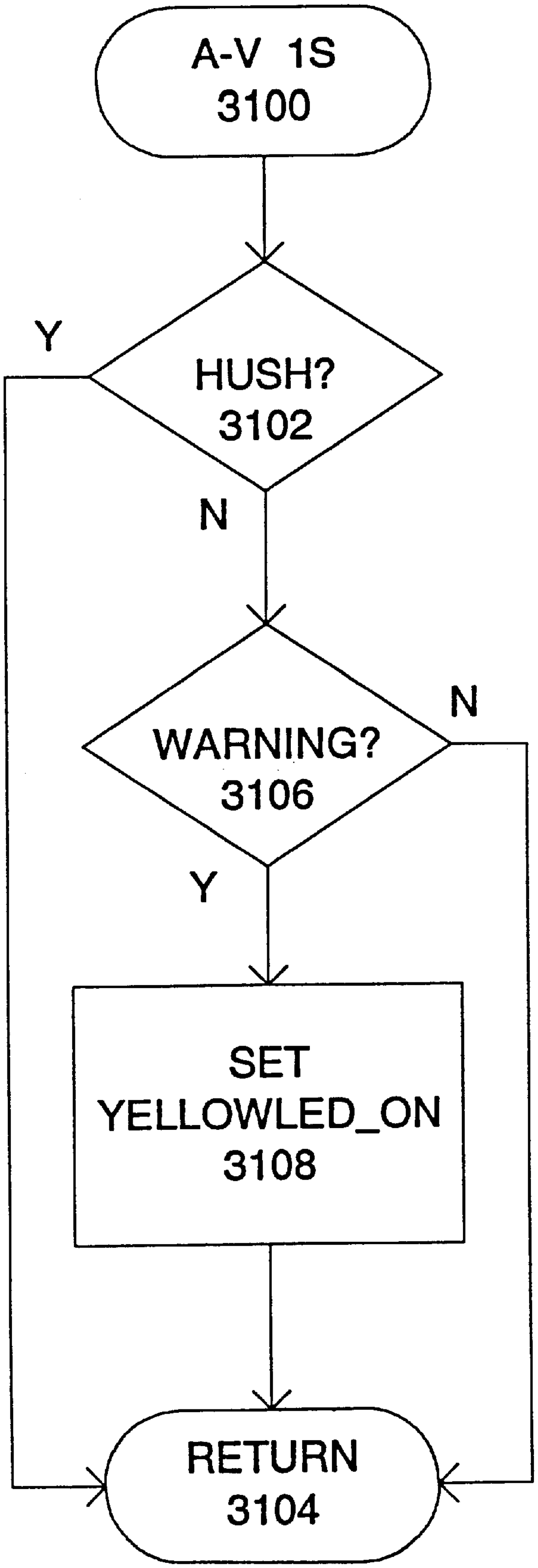
FIG. 31 is a flowchart of an audio visual 1 s subroutine of the embodiment of FIG. 6.

Referring to FIG. 31, when subroutine 3100 is called, assuming that the hush feature is not enabled as determined by a test of Hush flag (step 3102) and that a warning condition exists as determined by a test of Warning flag (step 3106), the YellowLED_On flag is set as appropriate (step 3108), and a return is effected (step 3104). If the hush feature is set or no warning condition exists, a return is directly carried out (step 3104).

Figure 32:
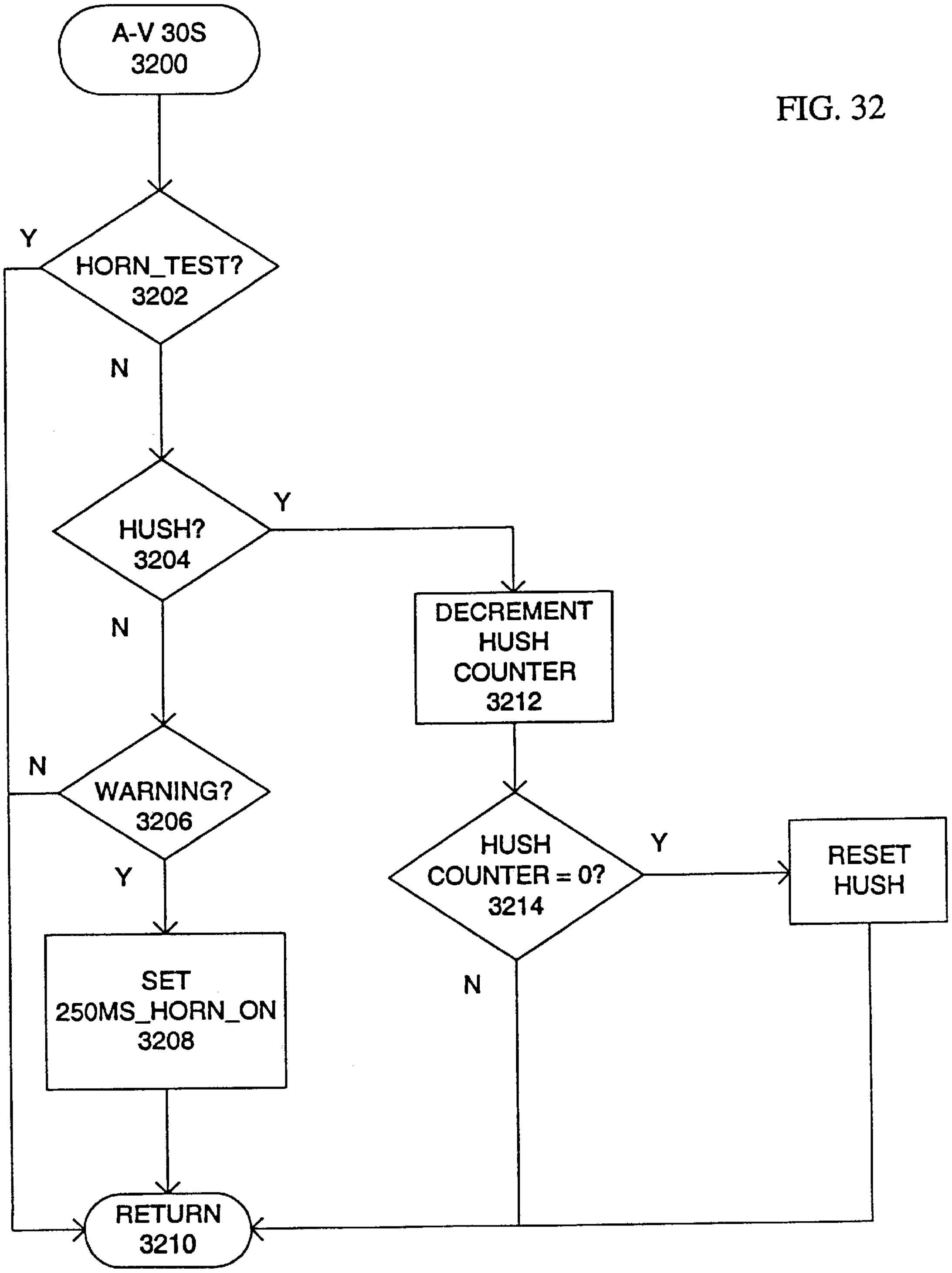
FIG. 32 is a flowchart of the an visual 30 s subroutine of the embodiment of FIG. 6.

Various actions are also taken at 30 second intervals. For example, as previously noted, the presence of a CO warning condition is indicated, inter alia, by activating the horn in a repeating sequence of 250 millisecond pulses at 30 second intervals, for the duration of the condition. Accordingly, when a 30 second interval is established during execution of main loop 2600, as determined by testing the 30 s flag (step 2636), subroutine 3200 is called. Referring to FIG. 32, assuming that there is no ongoing horn test as determined by test of Horn_Test flag (step 3202), that the hush feature is not enabled as determined by a test of Hush flag (step 3204) and that a warning condition exists as determined by a test of Warning flag (step 3206), 250 MS_Horn_On flag is enabled (step 3208), and a return is effected (step 3210). If it is determined that the horn test is enabled (step 3202) or that there is no warning condition (step 3206), a return is likewise effected (step 3210). If it is determined that the hush feature is enabled (step 3204), the Hush_Count is suitably decremented (step 3212). When the hush counter reaches a predetermined count (such as zero) as determined by a test at step 3214, the hush function is cancelled by resetting the Hush flag (step 3216), and a return is made (step 3210). If the hush counter has not decremented to zero, a return is made (step 3210) leaving the hush function still active.

Figure 33:
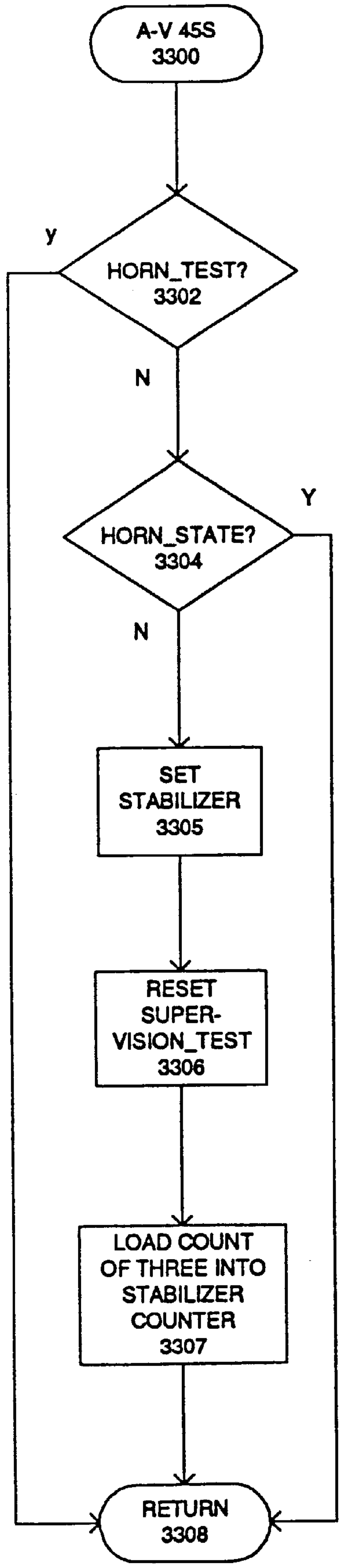
FIG. 33 is a flowchart of an audio visual 45 s subroutine of the embodiment of FIG. 6.

Still further actions are taken at intervals of 45 seconds. For example, as previously noted, the normal operating condition is confirmed by activating green LED1 for 10 millisecond duration pulses at 45 second intervals. Specifically, during execution of the main loop 2600, audio visual 45 S routine 3300 is called at 45 second intervals (Steps 2644–2648). Referring to FIG. 33, when audio visual 45 s routine 3300 is called, assuming that the horn test is not enabled as determined by a test of Horn_Test flag (step 3302) and that the horn is not enabled as determined by testing the Horn_State flag (step 3304), the Stabilizer flag is set (step 3305), sensor supervision is disabled (step 3306), three cycles are loaded into Stabilizer_Counter (step 3306), and a return is effected (step 3308). If it is determined that either the horn test or the horn are enabled (steps 3302, 3304), a return is immediately made (step 3308).

The sensor output is sampled once during each traversal of the main program loop 2600. The Exposure_Status flag is checked (step 2606) to determine if PPM/Index Exposure subroutine 3400 needs immediate service (step 26080; otherwise, PPM Index/Exposure subroutine 3400 is serviced every 30 seconds (step 2638). Accordingly, the PPM Index Update Routine 3400 is checked at least once during each program loop.

Referring to FIG. 34, when the PPM Index Update 3400 is called, an initial determination is made as to whether or not the CO level is within a measurable range for a given temperature. The sensor temperature reading is sampled (step 3402) and then compared to minimum and maximum values, e.g., 39 and 204 degrees F., respectively (steps 3404 and 3406). If the measured temperature value is less than the minimum or greater than the maximum value, the temperature is set to a predetermined intermediate value, e.g., 127 (step 3408). The temperature value (measured or set) is used as reference for accessing a look-up table to determine an appropriate multiplier and maximum values (steps 3410A–3410F). The CO sensor is then read (step 3412), and the sampled value is compared against the maximum sensor value for the measured (or set) temperature (step 3414). If the CO sensor reading is greater than the maximum for the temperature reading, the sensor value is set equal to the maximum sensor value times the index divided by 128 (step 3416). The sensor value (or, if greater than the maximum, the adjusted sensor value) is compared against a minimum value, e.g., 39 (step 3418). If the adjusted sensor reading is not greater than 39, indicating that the ambient CO exposure level is not at a warning or alarm level, the system is normalized: the horn is disabled, exposure is disabled, hush is disabled, warning is disabled, alarm is disabled and PPM level is set to 0 (steps 3420A–3420F).

If, on the other hand, the sensor value (or adjusted sensor value) is greater than the minimum value, e.g., 39, a PPM CO concentration level is determined from the lookup table (step 3422). If the CO concentration is determined to be greater than a possible developing alarm level, 100 PPM in the example, a determination is made (step 3428) as to whether this is the first pass through the process under these conditions. If so, the Exposure_Counter is loaded with a value dependent upon the determined CO concentration in order that a suitable time period (for example, as set forth in Table 1) can be started during which the CO concentration will be repeatedly checked to determine if a true alarm condition, for example, as previously described to meet UL standards, is present. A return is then made (step 3424). On the next loop through subroutine 3400, assuming that the CO concentration is still measured in excess of 100 PPM, the Exposure_Counter is decremented (step 3432) and then checked to see if the selected time period has been met during which the CO concentration has remained at an alarm value as may determined, merely by way of example, if the Exposure_Counter has decremented to zero (step 3424). If not, a return is made in anticipation of a subsequent pass through subroutine 3400. However, if the selected time, as represented by the count originally entered into the Exposure_Counter has expired (the count is found to be zero at step 3434), then the Alarm flag is set (step 3436) and a return made (step 3430). Setting the Alarm flag enables the issuance of the audio visual alarm (Table 2).

If the CO concentration is found to be less than 100 PPM (step 3426), but 40 PPM or more (step 3418), then, after the concentration level has been determined (step 3422), if this is the first pass through subroutine 3400 (step 3438), the Exposure_Counter is loaded with a suitable time representative value (for example, according to Table 1), and a return is made (step 3424). On succeeding passes through subroutine 3400, the Exposure_Counter 3440 is decremented (step 3440) and then checked (step 3442) to see if the procedure has timed out at the exposure level being monitored. If not, a return is made (step 3424), but, if so, the Warning flag is set (step 3444) to enable the distinctive audio visual warning (Table 2).

Because of the manifest importance of the warning and, especially, alarm conditions, the audio visual indications of these conditions should be distinctive and difficult or impossible to ignore. For example, it is generally preferable, under a warning condition, to sound the horn for at least 100 milliseconds at least once a minute and more preferable to sound the horn for at least 200 milliseconds about every thirty seconds. The audio warning signal presented in Table 2 has been found to be very effective. Similarly, if a visual indication is employed with the horn, in the case of a warning, it is desirable to flash one of the LEDs, such as the yellow LED, for a period of no more than 500 milliseconds at intervals of no more than about five seconds second. It is more preferable to flash the LED for a period of no more than about 50 milliseconds at intervals of about one second. The visual warning signal presented in Table 2 has been found to be very effective.

With respect to the more serious alarm condition, the horn is preferably sounded for at least two seconds at least once every five seconds and more preferable to sound the horn for at least five seconds about every twenty seconds. The audio alarm signal presented in Table 2 has been found to be very effective. Similarly, if a visual indication is employed with the horn, in the case of an alarm, it is desirable to flash one of the LEDs, such as the red LED, for a period of no more than about 100 milliseconds at intervals of no more than about five seconds. It is more preferable to flash the LED for a period of no more than about 20 milliseconds at intervals of about 500 milliseconds. The visual alarm signal presented in Table 2 has been found to be very effective.

Figure 35:
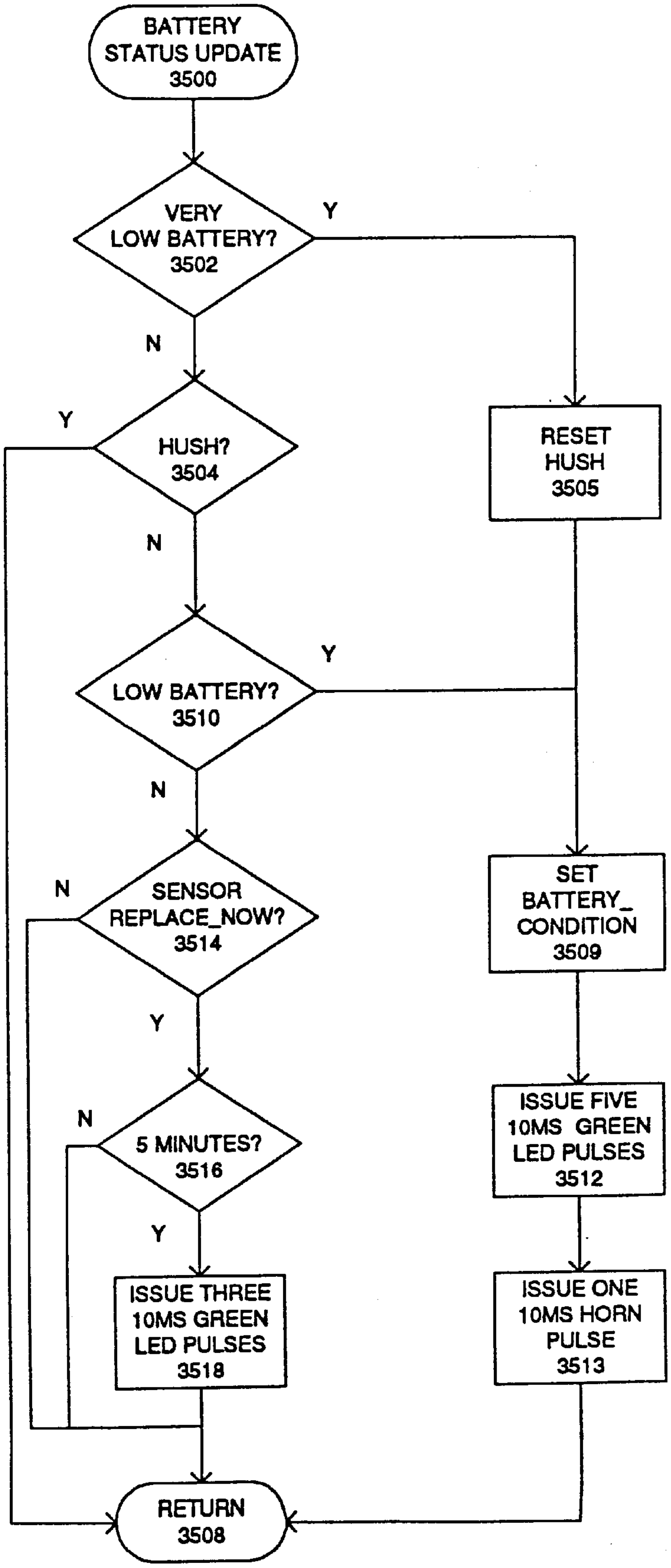
FIG. 35 is a flowchart of a battery status update routine of the embodiment of FIG. 6.
Figure 36:
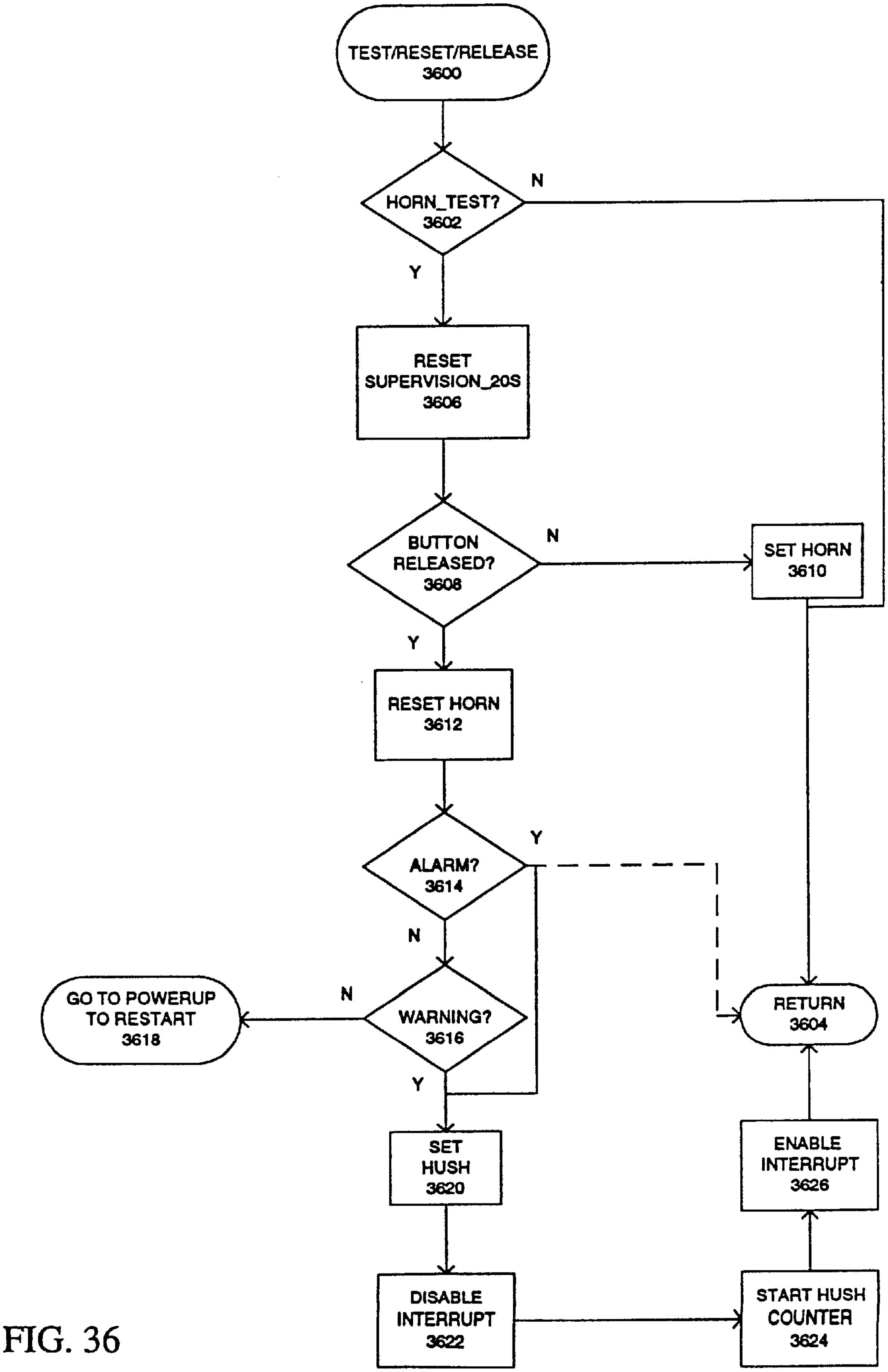
FIG. 36 is a flowchart of a test reset release routine of the embodiment of FIG. 6.
Figure 37:
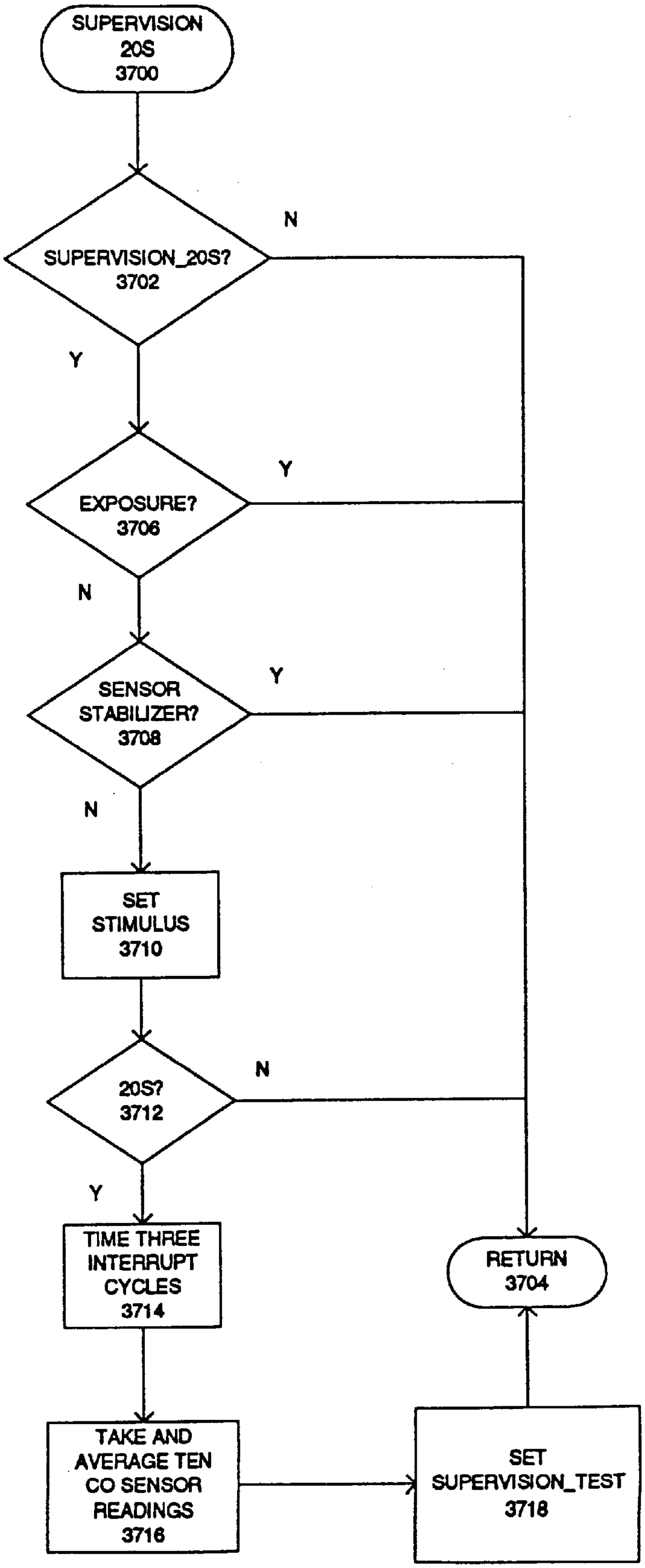
FIG. 37 is a flowchart of a sensor supervision 20 routine of the embodiment of FIG. 6.

The battery status is also checked on a periodic basis, once (step 2610) for each traversal of the main program loop in the example. Referring to FIG. 35, when the battery status update routine at 3500 is called, a very low battery condition (for example, a voltage reading of about 1.5 volts for a nominally 3.0 volt battery) is tested for (step 3502) by reading the battery voltage under load. If this feature is provided, but the battery is not very low, the state of the Hush flag is tested and, if set, a return is effected (step 3508). However, if the battery is very low, indicating that intervention is needed very soon, the Hush flag is reset (step 3505), the Battery_Condition flag is set (step 3509), five 10 MS green LED pulses are issued (step 3512), a 10 MS horn pulse is issued (step 3513 and a return is effected (step 3508).

If the battery is not very low, but the hush feature is not active, a test is made (step 3510) to determine whether a low (but not very low) battery condition exists; e.g., about 2.5 volts for a nominal 3.0 volt battery. If so, the Battery Condition flag is set, five 10 MS green pulses and one 10 MS horn pulse are issued and then a return effected (steps 3509, 3512, 3513 and 3508).

If the battery reading is within acceptable limits, the sensor Replace Sensor flag is tested (step 3514) and, if reset, a return is effected (step 3508). However, if the Replace_ Sensor flag is set, a test is made (step 3516) to determine if five minutes have elapsed. If not, a return is made (step 3508); if so, three 10 millisecond green LED pulses are issued (step 3518) and a return made.

Test/reset switch 134 serves a number of purposes. If actuated during a non-CO event, the horn will sound as long as the button is depressed. The initialization routine is also entered, i.e., the program is restarted. If, on the other hand, a CO warning event is occurring when test/reset switch 134 is depressed, the horn will sound so long as the button is depressed; then, it will institute a hush function which shuts off the audio visual alarms for a predetermined period such as five minutes. More specifically, referring to FIG. 36, the status of test/reset switch 134 is sampled every 250 milliseconds in conjunction with main loop 2600 (Step 2618).

When the Test/Reset/Release routine 3600 is called, Horn_Test flag 2318 is tested to determine whether or not the test/reset switch 134 has been activated (step 3602); if not, the routine is bypassed and a return effected (step 3604). Assuming that the Horn_Test flag is set, the Supervision_ 20 S flag is reset (step 3606), and the current state of the test/reset switch 134 is then sampled to determine whether or not the button is still being depressed (step 3608). If the button is still depressed (has not been released), the horn is turned on (step 3610), and a return is effected (step 3604). If, on the other hand, the switch 134 has been released, the horn is turned off (step 3612). The Alarm flag and the Warning flag are tested to determine whether a CO event is occurring. If neither the Warning nor the Alarm flag is active (steps 3614 and 3616), the initialization routine is run to restart the program (step 3618). If, however, either the Alarm or Warning flags are set, the hush feature is activated. The Hush flag is set (step 3620), the interrupts are disabled (step 3622) and the Hush_Count initiated (step 3624). The count loaded into Hush_Count may be different for warning and alarm conditions to correspondingly set the hush period as previously described. The interrupt are then reenabled (step 3626), and a return is effected (step 3604). Alternatively, as indicated by the dashed line, if an alarm condition is detected at step 3614, the hush feature can be defeated by a direct jump to return (step 3604).

The Supervision_20 s routine is checked once each second (step 2630) during the execution of the main loop 2600. When the sensor supervision 20 S routine 3700 is called, the Supervision 20 S flag is tested (step 3702).

Figure 38:
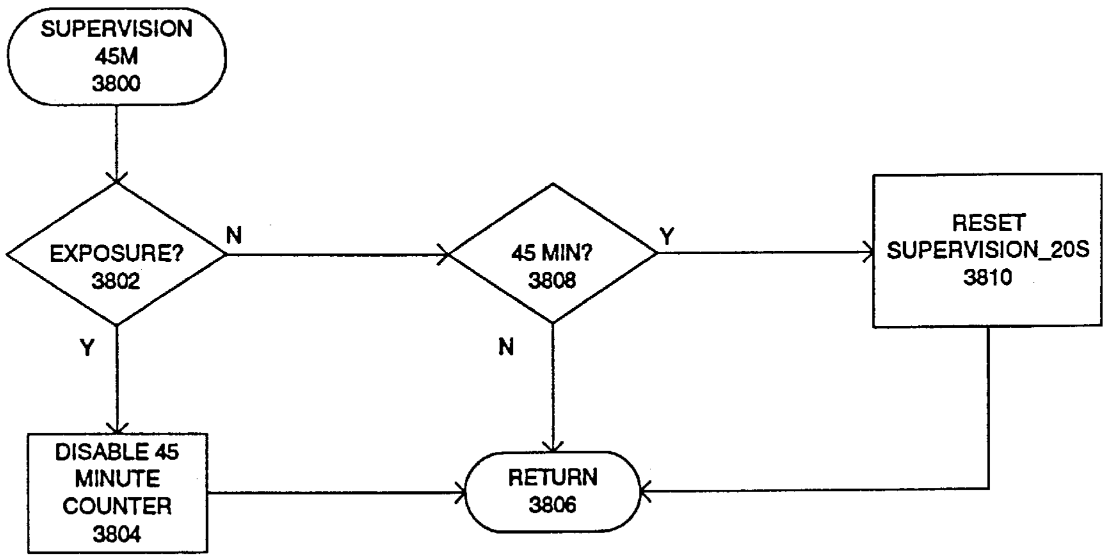
FIG. 38 is a flowchart of the sensor super vision 45 min. routine of the embodiment of FIG. 6.

The Supervision_20 S flag is enabled on a periodic basis, e.g., every 45 minutes, to effect a full sensor test as will be explained in conjunction with FIG. 38. If the Supervision_20 s flag is not set, the routine is bypassed, and a return is effected (step 3704). Assuming that the Supervision 20 s flag is set to assert a sensor test, the Exposure_Counter is examined to determine if substantively detectable CO is present (step 3706), and if so, the routine is bypassed and a return effected (step 3704). Similarly, if the sensor stabilizer is on, as determined by testing the Stabilizer flag (step 3708), a return is effected (step 3704). Assuming that the sensor Supervision_20 s flag is set, that the Exposure_Counter does not indicate significant ongoing CO exposure and that the Stabilizer flag is not set, a stimulus is enabled (step 3710).

A test is then performed to determine whether 20 seconds have elapsed (step 3712). If 20 seconds have not elapsed, a return is effected (step 3704). When 20 seconds have elapsed, three interrupt cycles are timed (step 3714), the sensor is sampled ten times and the average value computed (step 3716), the supervision test is enabled, and a return is effected (step 3704).

As previously noted, a test of the sensor is carried out on a periodic basis. In the example, the function is performed by sensor supervision 45 minute routine 3800 which is checked every 45 seconds (step 2646) by main loop 2600. Referring now to FIG. 38, when the routine is called, the Exposure_Counter is checked to ensure that CO in excess of a minimum level is not present (step 3802). If the concentration of CO is beyond the minimum level, a 45 minute timer is disabled (step 3804), and a return is effected (step 3806).

Assuming that a minimum level of CO is not present, the 45 minute counter is tested to determine if the 45 minutes time period has elapsed (step 3808) since the last full sensor test. If not, a return is effected (step 3806). If the 45 minute time period has elapsed, the Supervision_20 flag is enabled prior to effecting a return.

Figure 39:
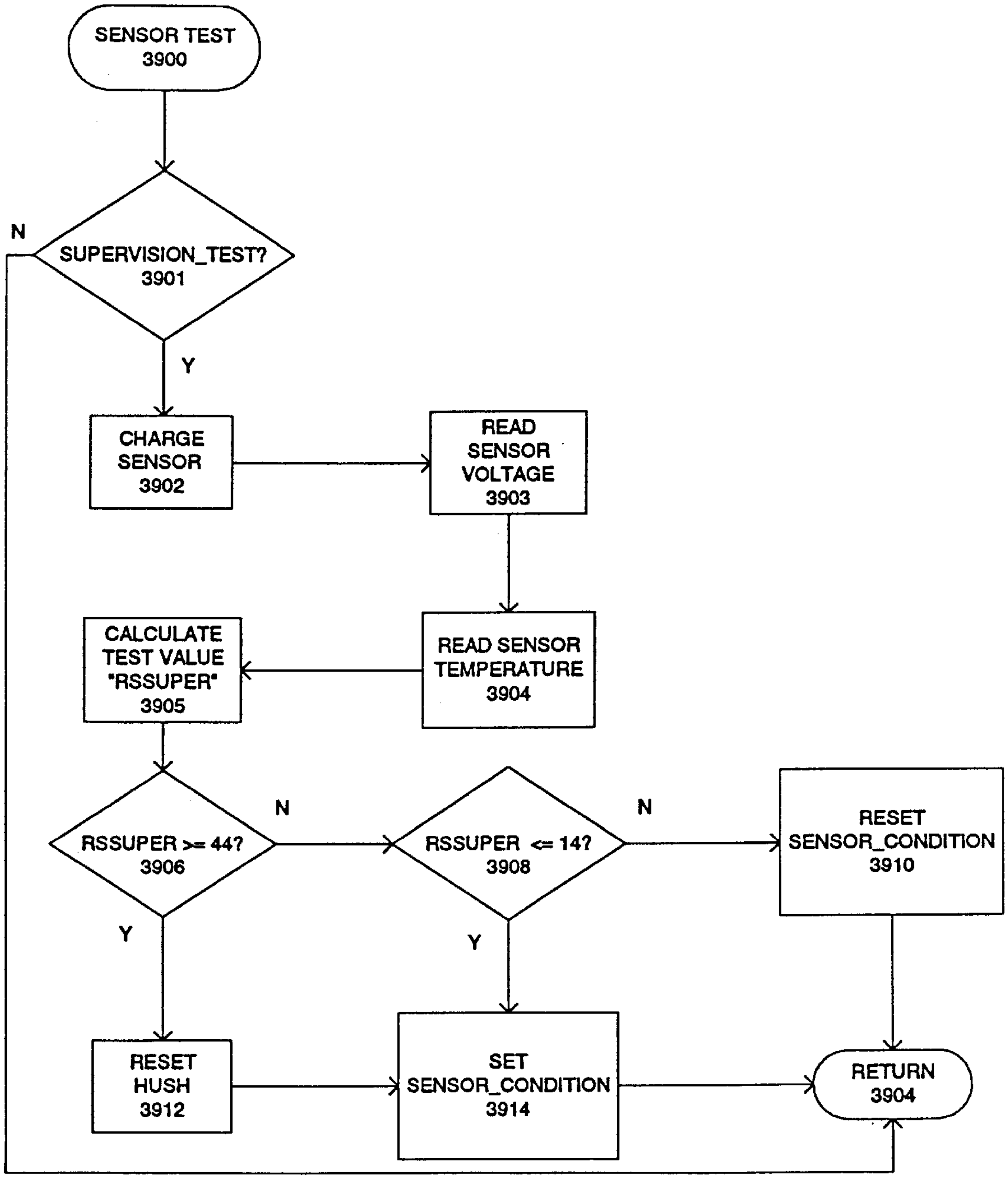
FIG. 39 is a flowchart of a sensor supervision fault routine of the embodiment of FIG. 6.

The sensor supervision fault routine is checked (step 2632) at one second intervals in the course of executing main loop 2600. Referring to FIG. 39, when routine 3900 is called, the Supervision_Test flag is tested (step 3901) and if not enabled, a return effected (step 3904). If, however, the Supervision_Test flag is enabled, Q4 (FIG. 4) is momentarily turned on to issue a test voltage which, in series with a current limiting resistor R4, serves as a source of current which is briefly placed across the sensor 402 to charge it as a large capacitor (step 3902), then the voltage across the sensor is read (step 3903) to determine how much the charge changed, a value which is indicative of sensor condition. The sensor temperature is read (step 3904) and a test value RSSUPER is calculated (step 3905) by, e.g., subtracting the temperature compensated sensor reading from the average of sensor supervision analog-to-digital readings. The calculated value is then tested against upper and lower range limits. More specifically in the example, RSSUPER is tested against a predetermined upper limit, e.g., 44 (step 3906), and a predetermined lower limit, e.g., 14 (step 3908). If RSSUPER is not greater than or equal to the higher limit and not less than or equal to the lower limit, the Sensor_Condition flag is reset (step 3910) and a return effected. This signifies that the CO sensor has been determined to be good.

If the test value RSSUPER is greater than or equal to the upper limit, the Hush flag is reset (step 3912), the Sensor_Condition flag is set and a return effected (step 3904). Similarly, if RSSUPER is less than or equal to the lower limit, the Sensor-Condition flag is set (step 3914) and a return effected (step 3904).

It will be seen that, if the sensor condition is such condition that failure can be expected, but not for a relatively long period, i.e., in excess of eight hours, the hush function is allowed. However, if the condition of the sensor is such that it cannot be trusted for a shorter period, the hush function is inhibited. In either instance, a suitable distinctive audio alarm is issued and will continue to sound in the selected pattern for so long as the condition exists or until, if allowed, the hush function is established by actuating the test/reset switch or, or course, until power is removed from the detector.

The audio alarm indicating a failing sensor is preferably a plurality of audio pulses each of a duration of less than 50 milliseconds each repeating at intervals of no more than 15 minutes, more preferably a plurality of audio pules each of a duration of about 10 milliseconds each repeating at intervals of no more than 10 minutes. The audio alarm pattern indicating a failing sensor set forth in Table 2 has been found to be particularly distinctive and effective in alerting a user to the condition requiring attention.

It will be understood that while various of the conductors and connections are shown in the drawing as single lines, they are not so shown in a limiting sense, and may comprise plural conductors or connections as understood in the art. Similarly, power connections, various control lines and the like, to the various elements are omitted from the drawing for the sake of clarity. Further, the above description is of preferred exemplary embodiments of the present invention, and the invention is not limited to the specific forms shown. Modifications may be made in the design and arrangement of the elements within the scope of the invention, as expressed in the claims.

What is claimed is:

1. A dangerous condition warning device adapted to issue an alarm when a sensed dangerous condition exceeds a predetermined status, which dangerous condition monitoring device is operable from a battery, said dangerous condition monitoring device comprising a dangerous condition monitoring device circuit including:

A) a processor;

B) an audio annunciator;

C) at least one visual indicator;

D) battery condition monitoring means cooperating with said processor to periodically check the output voltage of the battery under load, said battery condition monitoring means including means:

1) for detecting a first low battery condition in which battery failure can be expected after a relatively long period and for issuing a first battery problem indication in response thereto; and 2) a second low battery condition in which battery failure is imminent and replacement should be undertaken and for issuing a second battery problem indication in response thereto;

E) audio low battery warning means adapted to drive said audio annunciator to issue an audio warning of about 10 milliseconds duration every minute in response to the issuance of each of said first and second battery problem indications;

F) visual low battery indicator means adapted to drive said visual indicator to issue a series of five flashes of about 10 milliseconds spaced about 500 milliseconds apart, the first flash of the series of five flashes issued in coordination with the issuance of each brief audio warning;

G) a manually-actuable switch coupled to said processor;

H) means responsive to actuation of said manually-actuable switch for inhibiting drive to said audio annunciator because of the issuance of said first battery problem indication for a predetermined period if the first low battery condition is detected; and I) means responsive to actuation of said manually-actuable switch after said second battery problem indication has issued for preventing inhibiting the drive to said audio annunciator if the second low battery condition is detected.

2. In a dangerous condition warning device adapted to issue an alarm when a sensed dangerous condition exceeds a predetermined status, which dangerous condition monitoring device is operable from a battery, said dangerous condition monitoring device comprising a dangerous condition monitoring device circuit including:

A) a processor;

B) an audio annunciator;

C) battery condition monitoring means cooperating with said processor to periodically check the output voltage of the battery under load;

D) means for issuing an indication that a low battery condition has been detected; and E) audio low battery warning means adapted to drive said audio annunciator to issue a brief audio warning periodically in response to the issuance of the indication;

the improvement in which said dangerous condition monitoring device circuit further includes:

F) a manually-actuable switch coupled to said processor; and

G) means responsive to actuation of said manually-actuable switch after said indication has issued for inhibiting drive to said audio annunciator because of the issuance of said indication for a predetermined period.

3. The dangerous condition warning device of claim 2 in which:

A) said battery condition monitoring means further includes means for detecting a first low battery condition in which battery failure can be expected after a relatively long period and a second low battery condition in which battery failure is imminent and replacement should be undertaken; and B) actuation of said manually-actuable switch inhibits drive to said audio annunciator for a predetermined period only if the first low battery condition is detected and actuation of said manually-actuable switch is prevented from inhibiting drive to said audio annunciator for a predetermined period only if the second low battery condition is detected.

4. The dangerous condition warning device of claim 2 in which said dangerous condition monitoring device circuit further includes:

A) at least one visual indicator; and

B) visual low battery indicator means adapted to drive said visual indicator to issue a distinctive series of flashes in coordination with the issuance of each brief audio warning.

5. The dangerous condition warning device of claim 3 in which said dangerous condition monitoring device circuit further includes:

A) at least one visual indicator; and

B) visual low battery indicator means adapted to drive said visual indicator to issue a distinctive series of flashes in coordination with the issuance of each brief audio warning.

6. The dangerous condition warning device of claim 4 in which each brief period during which the audio warning is issued is no more than about 20 milliseconds occurring at intervals of no less than about one minute and each distinctive series of flashes by said visual indicator comprises at least three flashes of no more than about 20 milliseconds each.

7. The dangerous condition warning device of claim 5 in which each brief period during which the audio warning is issued is no more than about 20 milliseconds occurring at intervals of no less than about one minute and each distinctive series of flashes by said visual indicator comprises at least three flashes of no more than about 20 milliseconds each.

8. The dangerous condition warning device of claim 4 in which each brief period during which the audio warning is issued is less than 20 milliseconds occurring at intervals of no less than about one minute and each distinctive series of flashes by said visual indicator comprises at least five flashes of less than 20 milliseconds each.

9. The dangerous condition warning device of claim 5 in which each brief period during which the audio warning is issued is less than 20 milliseconds occurring at intervals of no less than about one minute and each distinctive series of flashes by said visual indicator comprises at least five flashes of less than 20 milliseconds each.

10. The dangerous condition warning device of claim 6 in which each brief period during which the audio warning is issued is less than 20 milliseconds occurring at intervals of no less than about one minute and each distinctive series of flashes by said visual indicator comprises at least five flashes of less than 20 milliseconds each.

11. The dangerous condition warning device of claim 7 in which each brief period during which the audio warning is issued is less than 20 milliseconds occurring at intervals of no less than about one minute and each distinctive series of flashes by said visual indicator comprises at least five flashes of less than 20 milliseconds each.

* * * * *